US010158236B2

(12) United States Patent
Matsumoto et al.

(10) Patent No.: US 10,158,236 B2
(45) Date of Patent: Dec. 18, 2018

(54) POWER TRANSMISSION DEVICE, VEHICLE EQUIPPED WITH POWER TRANSMISSION DEVICE, AND WIRELESS POWER TRANSMISSION SYSTEM

(71) Applicant: Panasonic Intellectual Property Management Co., Ltd., Osaka (JP)

(72) Inventors: Hiromu Matsumoto, Osaka (JP); Hiroshi Kanno, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 336 days.

(21) Appl. No.: 14/886,141

(22) Filed: Oct. 19, 2015

(65) Prior Publication Data
US 2016/0121732 A1    May 5, 2016

Related U.S. Application Data

(60) Provisional application No. 62/073,967, filed on Nov. 1, 2014.

(30) Foreign Application Priority Data

Dec. 9, 2014 (JP) .................... 2014-249024

(51) Int. Cl.
*H01F 27/28* (2006.01)
*H02J 7/02* (2016.01)
(Continued)

(52) U.S. Cl.
CPC ............. *H02J 5/005* (2013.01); *B60L 11/182* (2013.01); *B60L 11/1824* (2013.01); (Continued)

(58) Field of Classification Search
CPC .. H02J 50/12; H02J 50/10; H02J 50/70; H02J 5/005; H02J 7/025; H02J 7/0042; H01F 38/14; H01F 2027/2809; H01F 5/003
See application file for complete search history.

(56) References Cited

U.S. PATENT DOCUMENTS

| 7,952,322 | B2 * | 5/2011 | Partovi | ................... H01F 5/003 320/108 |
| 2009/0015197 | A1 * | 1/2009 | Sogabe | .................. H02J 7/0011 320/108 |
| 2015/0054348 | A1 | 2/2015 | Akiya | |

FOREIGN PATENT DOCUMENTS

| JP | 2970303 B | 11/1999 |
| JP | 2008-205215 | 9/2008 |

(Continued)

OTHER PUBLICATIONS

The Extended European Search Report dated Mar. 2, 2016 for the related European Patent Application No. 15191141.9.

*Primary Examiner* — Ryan Johnson
(74) *Attorney, Agent, or Firm* — Greenblum & Bernstein, P.L.C.

(57) ABSTRACT

A power transmission device having a surface a part of which defines a power transmission plane, the device includes: a power transmission circuit converting DC power into AC power; and a power transmission coil structure including 2N planar coils laminated in a direction which is perpendicular to the power transmission plane, the power transmission coil structure wirelessly transmitting the converted AC power to a power receiving coil of a power receiving device via the power transmission plane and being disposed on a side toward the power transmission plane in the power transmission device. The 2N planer coils constitute coil groups including a coil group in which a planar coil having an i'th highest inductance out of the 2N planar coils (Continued)

and a planar coil having an i'th-lowest inductance are connected in series and the coil groups are connected in parallel to each other.

20 Claims, 22 Drawing Sheets

(51) Int. Cl.
*H02J 5/00* (2016.01)
*H01F 38/14* (2006.01)
*H02J 50/12* (2016.01)
*H02J 50/70* (2016.01)
*B60L 11/18* (2006.01)

(52) U.S. Cl.
CPC ......... *H01F 27/2804* (2013.01); *H01F 38/14* (2013.01); *H02J 50/12* (2016.02); *H02J 50/70* (2016.02); *B60L 2230/10* (2013.01); *H01F 2027/2809* (2013.01); *H02J 7/025* (2013.01); *Y02T 10/7005* (2013.01); *Y02T 10/7088* (2013.01); *Y02T 90/12* (2013.01); *Y02T 90/121* (2013.01); *Y02T 90/122* (2013.01); *Y02T 90/14* (2013.01)

(56) References Cited

FOREIGN PATENT DOCUMENTS

JP        2013-251455       12/2013
WO        2013/125072 A1    8/2013

* cited by examiner

PRIOR ART

PRIOR ART

L1<L2<L3<L4

L1<L2<L3<L4

L1<L2<L3<L4<L5<L6

L1 < L2 < L3 < L4

L1<L2<L3<L4<L5<L6

L2<L3<L1<L4

L1 < L2 < L3 < L4

L1 < L2 < L3 < L4

POWER TRANSMISSION DEVICE, VEHICLE EQUIPPED WITH POWER TRANSMISSION DEVICE, AND WIRELESS POWER TRANSMISSION SYSTEM

BACKGROUND

1. Technical Field

The present disclosure relates to a power transmission device that transmits AC electric power noncontact by electromagnetic inductance between a transmission coil and a reception coil, a vehicle equipped with the power transmission device, and a wireless power transmission system.

2. Description of the Related Art

Various mobile devices such as cellular phones have come into widespread use. The electric power consumption of mobile devices continues to rise, due to improved functions and performance, and a wider variety of contents. If the electric power consumption of a mobile device operated with a battery having a capacity that is fixed beforehand increases, the operating time of the mobile device becomes shorter. Wireless power transmission systems are gathering attention as a technology to make up for restrictions of battery capacity. A wireless power transmission system operates by electromagnetic induction between a power transmission coil in a power transmission device and a power receiving coil in a power receiving device causing noncontact transmission of AC power from the power transmission device to the power receiving device. Particularly, a wireless power transmission system using a resonance power transmission coil and a resonance power receiving coil can maintain high transmission efficiency even if the positions of the power transmission coil and the power receiving coil are deviated. Accordingly, resonance wireless power transmission systems are applied in various fields.

As of recent, systems where a power transmission device to perform noncontact charging of mobile devices (power receiving devices) such as cellular phones and so forth is installed in a vehicle are starting to come into use. These systems enable noncontact charging of mobile devices in a car. The power transmission device desirably is constituted as thin as possible, to take up as little space as possible.

An example of such related art is disclosed in Japanese Unexamined Patent Application Publication No. 2008-205215. However, this related art has a problem in that forming the power transmission device thinner increases the loss of the power transmission coil, and transmission efficiency decreases. Accordingly, there has been demand for a power transmission device that transmits AC power with high efficiency.

SUMMARY

In one general aspect, the techniques disclosed here feature a power transmission device having a surface a part of which defines a power transmission plane, the device includes: a power transmission circuit converting DC power into AC power; and a power transmission coil structure including 2N planar coils (N is an integer of two or larger) laminated in a direction which is perpendicular to the power transmission plane, the power transmission coil structure wirelessly transmitting the converted AC power to a power receiving coil of a power receiving device via the power transmission plane and being disposed on a side toward the power transmission plane in the power transmission device. The 2N planer coils constitute coil groups including a coil group in which a planar coil having an i'th highest inductance out of the 2N planar coils and a planar coil having an i'th-lowest inductance are connected in series where i denotes any one integer of one to N, and the coil groups are connected in parallel to each other. According to this configuration, a power transmission device that is thin and transmits AC power with high efficiency can be provided.

It should be noted that general or specific embodiments may be implemented as a system, a device, a method, an integrated circuit, a computer program, or a storage medium, and may be realized by any selective combination of system, device, method, integrated circuit, computer program, and storage medium.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Underlying Knowledge Forming Basis of the Present Disclosure

Figure 1:
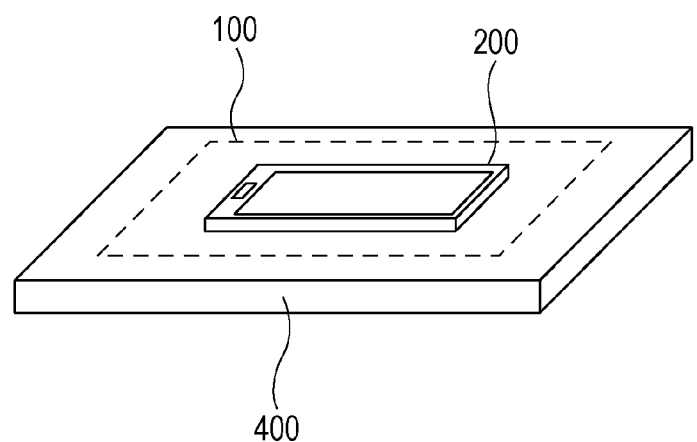
FIG. 1 is a diagram illustrating an example of a wireless power transmission system installed in a vehicle.

The present inventors have found that the following problem occurs in the power transmission device described in the Description of the Related Art. FIG. 1 is a perspective view of an example of a wireless power transmission system installed in a vehicle. This system includes a power transmission device 100 installed in an onboard console box 400, and a power receiving device 200. The power transmission device 100 has at least one power transmission coil including multiple planar coils layered perpendicularly to a power transmission face where power is transmitted to the power receiving device.

Japanese Unexamined Patent Application Publication No. 2008-205215 discloses a layered coil unit used in wireless power transmission systems. The layered coil unit includes multiple planar hollow coils. Each coil is configured from a spiral electro-conductive pattern constituted on an insulating board, and the coils are layered in the thickness direction of the insulting boards.

Figure 2:
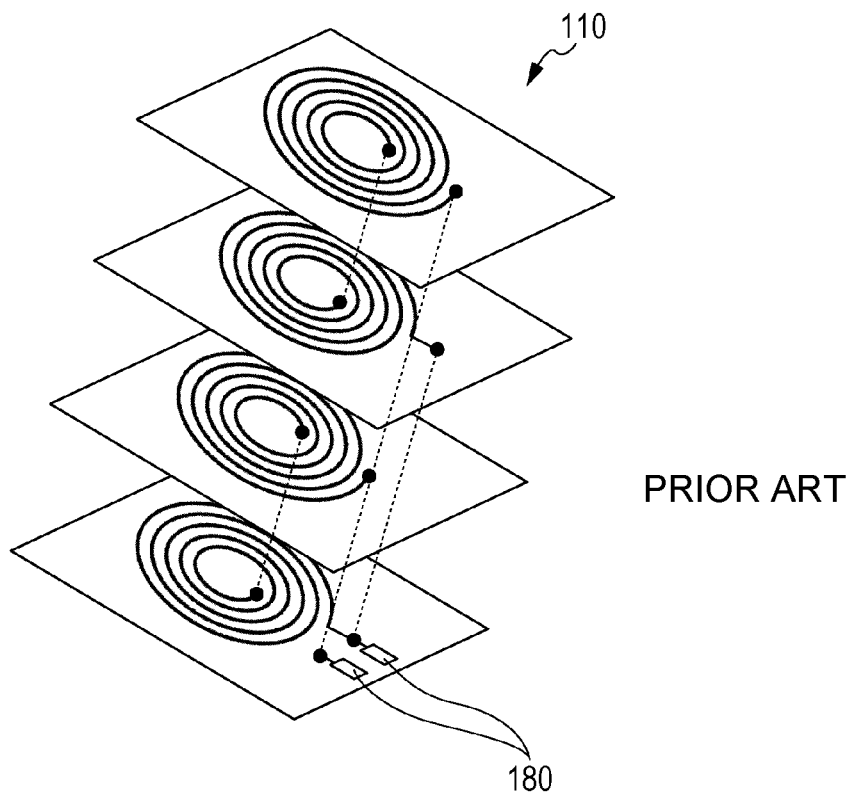
FIG. 2 is a disassembled perspective view illustrating multiple planar coils having the same configuration as layered coils disclosed in Japanese Unexamined Patent Application Publication No. 2008-205215.
Figure 3:
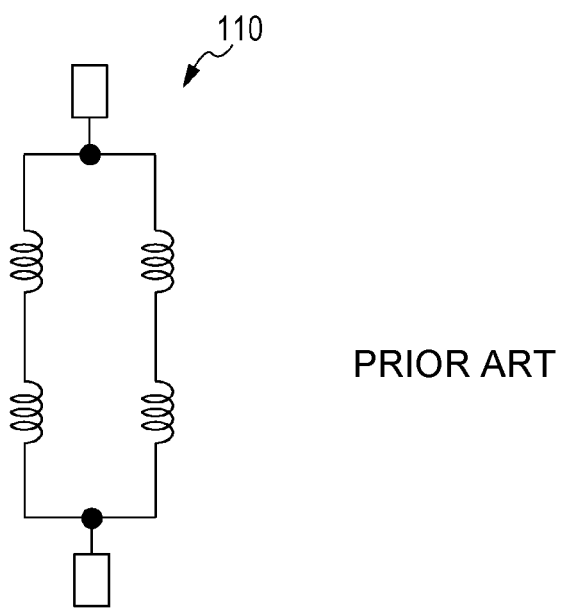
FIG. 3 is an equivalent circuit diagram of the layered coils illustrated in FIG. 2.

FIG. 2 is a disassembled perspective view illustrating multiple planar coils having the same configuration as layered coils disclosed in Japanese Unexamined Patent Application Publication No. 2008-205215. FIG. 3 is an equivalent circuit diagram of the multiple layered coils illustrated in FIG. 2. A thin board such as a flexible board is used as the insulating board for the layered coil. One planar coil where an electroconductive pattern (0.035 mm) is constituted into a spiral is fabricated upon the flexible board. Four planar coils are fabricated using the same method, and these four planar coils are electrically connected as illustrated in FIGS. 2 and 3, in a state where the planar coils are layered. Two of the four planar coils are connected serially, and the remaining two are also connected serially. The two sets of planar coils are connected in parallel. Japanese Unexamined Patent Application Publication No. 2008-205215 states that this configuration enables a power transmission device which is thin and which has improved Q value (Quality Factor) to be provided.

Figure 4A:
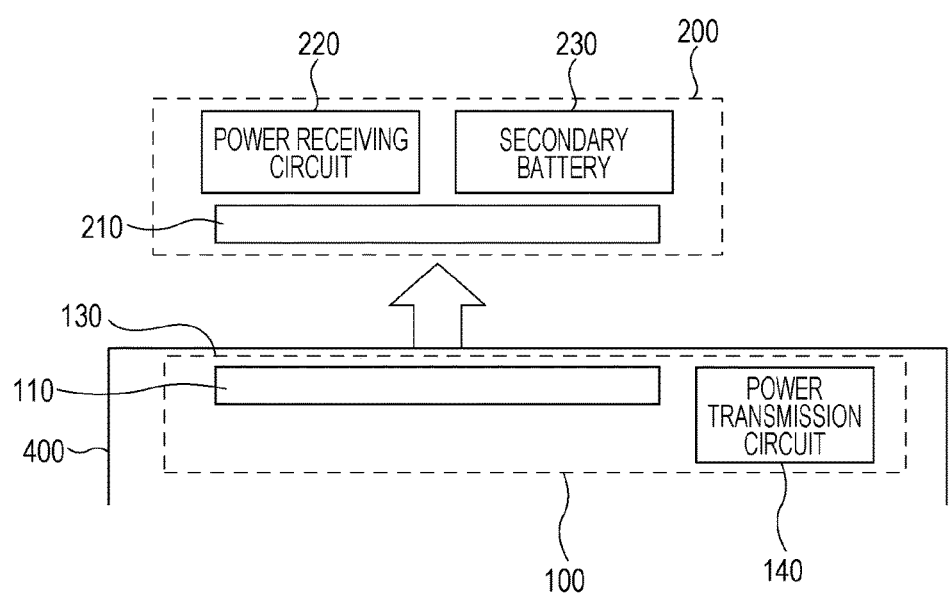
FIG. 4A is a cross-sectional diagram illustrating an example of a wireless power transmission system including a power transmission device and a power receiving device.
Figure 4B:
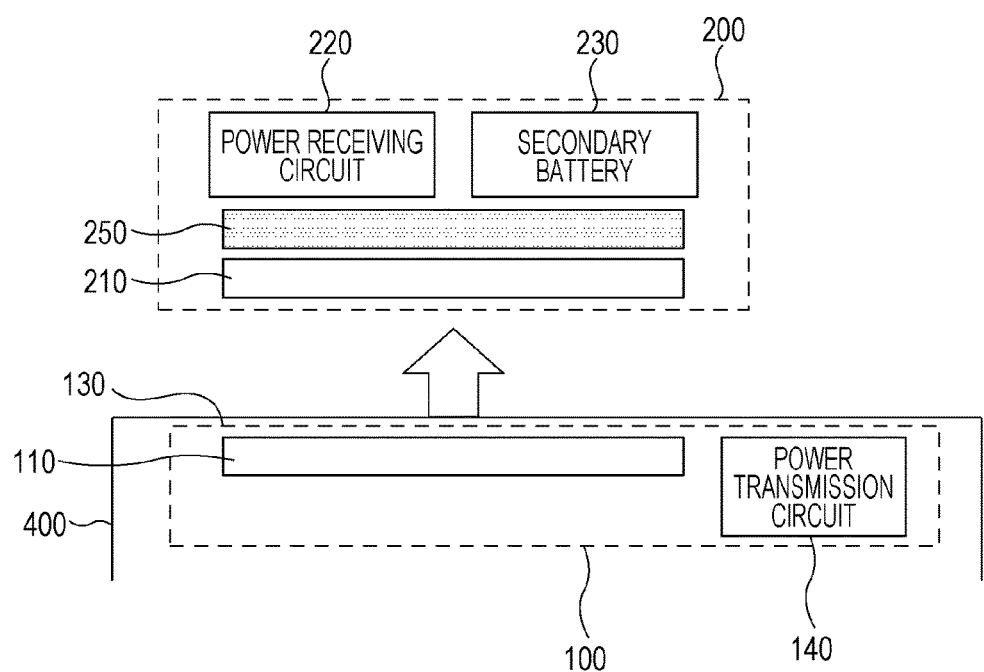
FIG. 4B is a cross-sectional diagram illustrating an example of a wireless power transmission system including a power transmission device and a power receiving device having a magnetic substance.

FIG. 4A is a cross-sectional diagram illustrating an example of a wireless power transmission system. The power transmission device 100 in this example includes a power transmission antenna 110 and a power transmission circuit 140. The power receiving device 200 includes a power receiving antenna 210, a power receiving circuit 220, and a secondary battery 230. The power transmission antenna 110 includes a power transmission coil including multiple planar coils such as illustrated in FIG. 2, and a resonance capacitor omitted from illustration. Generally, if the number of winds and size of conductor patterns in each of the multiple planar coils are about the same in a power transmission device 100 where no magnetic substance nor metal is disposed near the power transmission antenna 110 as illustrated in FIG. 4A, the inductance values thereof will be about the same value. However, in an actual wireless power transmission system, there are many cases where the inductance values of the planar coils included in the power transmission antenna 110 are not the same. For example, there are cases where a magnetic substance 250 is disposed in the power receiving device 200, such as illustrated in FIG. 4B. Due to the demand for further reduction in thickness of the power receiving device 200, this sort of magnetic substance 250 is disposed near the power receiving antenna 210 to reduce eddy current loss of the power receiving coil of the power receiving antenna 210.

Figure 4C:
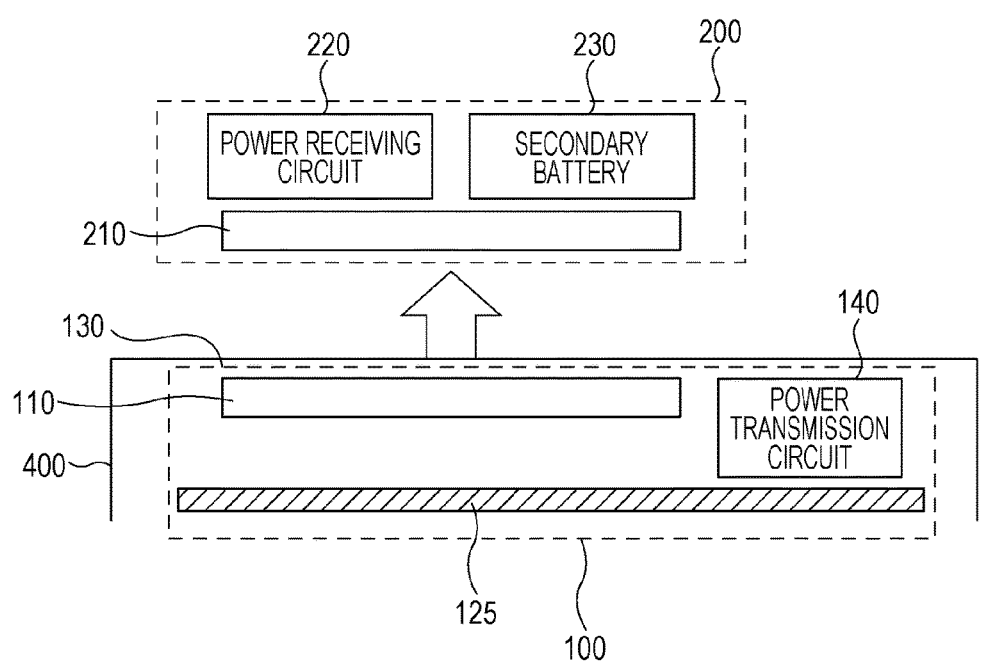
FIG. 4C is a cross-sectional diagram illustrating an example of a wireless power transmission system including a power transmission device having a metal casing, and a power receiving device.

In such a configuration, the magnetic substance 250 in the power receiving device 200 is situated nearby the power receiving coil in a state where the power transmission device 100 and the power receiving device 200 are facing each other (e.g., when transmit power). As a result, the inductance values of the multiple planar coils making up the power transmission coil have different inductance values from each other. The same thing can occur in a case where the casing of the power transmission device 100 is made of metal, as illustrated in FIG. 4C. In this case, the closer the planar coil is to metal casing 125, the lower the inductance generally is.

It was found that, if a power transmission device 100 having layered coils the same as that disclosed in Japanese Unexamined Patent Application Publication No. 2008-205215 is made to face a power receiving device 200 in which the magnetic substance 250 has been disposed as illustrated in FIG. 4B, and evaluated, the amount of heat generated was great, and transmission efficiency deteriorated. The present inventors analyzed the cause thereof as follows.

Figure 5:
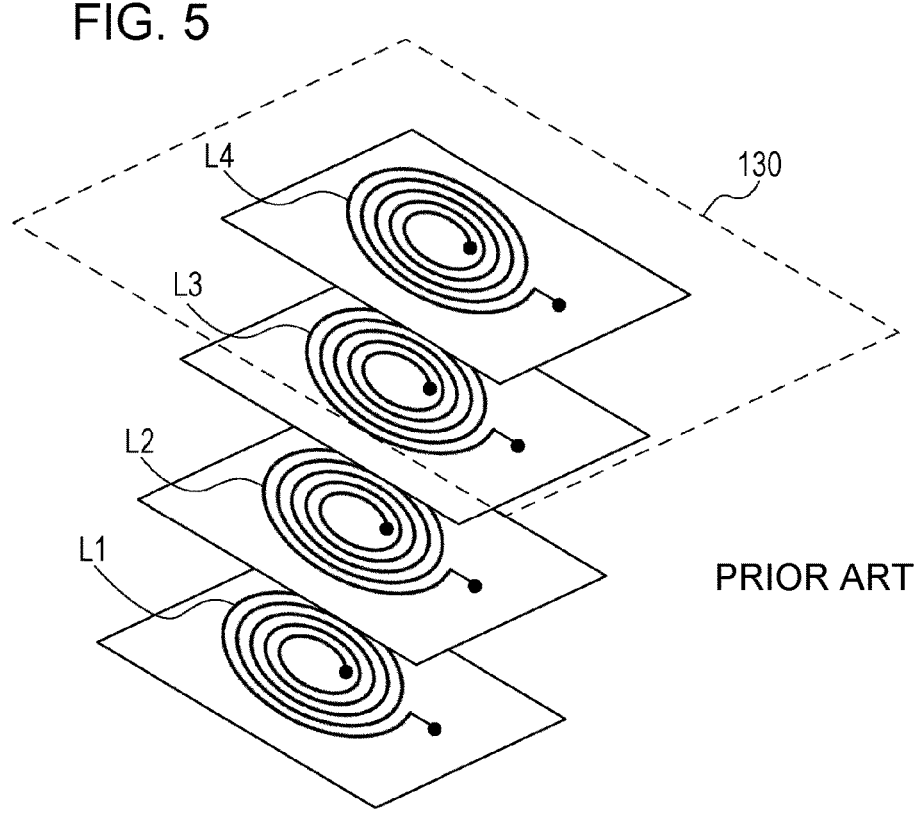
FIG. 5 is a perspective view illustrating a power transmission device having four planar coils.

The present inventors fabricated a group of planar coils L1 through L4 such as illustrated in FIG. 5, and placed the power receiving device 200 in which the magnetic substance 250 was disposed facing a power transmission plane 130. Table 1 illustrates the results of having analyzed the properties of inductance L and AC resistance R of the planar coils L1 through L4 in this state.

TABLE 1

| f = 150 kHz | L [µH] | R [mOhm] |
|---|---|---|
| L4 | 6.95 | 617 |
| L3 | 6.80 | 617 |
| L2 | 6.66 | 616 |
| L1 | 6.53 | 612 |

It can be seen from Table 1 that the respective inductance values are in the order of large value to small value from the planar coils distanced from the planar coil close to the magnetic substance 250, i.e., in the order of L4 to L1. A general purpose electromagnetic field simulator was used for analysis. The analysis conditions were as follows. The planar coils were constituted of copper patterns on glass epoxy resin (FR4) boards. The outer diameter of each planar coil was 45 mm, the line width 0.5 mm, the inter-line pitch 1 mm, the number of winds was 10 turns, the copper was 70 µm in thickness, and the distance between the surfaces of the copper patterns of each layer was 0.2 mm. The relative permeability of the magnetic substance was 200, and the size was 50×50×1 mm. The distance from the surface of the copper pattern at the power transmission plane side of the power transmission coil to the surface of the magnetic substance disposed in the power receiving device was 2 mm. The analyzing frequency was 150 kHz. An aluminum plate (50×50×0.5 mm), omitted from illustration, was disposed directly above the magnetic substance, to simulate a thermal radiation plate.

Figure 6:
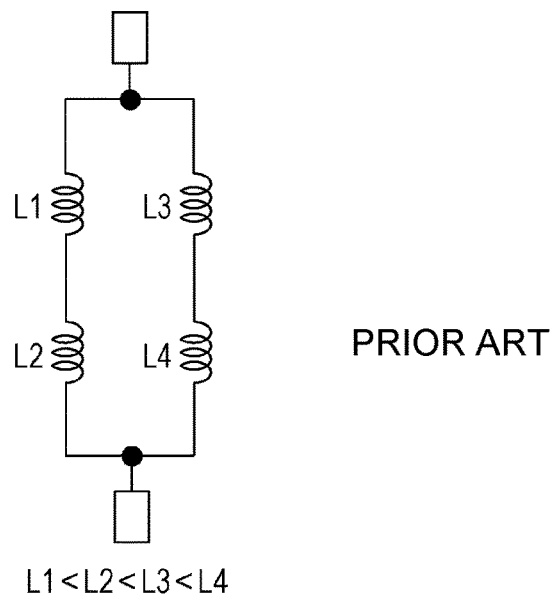
FIG. 6 is an equivalent circuit diagram of the power transmission coils illustrated in FIG. 2.

FIG. 6 is an equivalent circuit diagram illustrating the electric connection of the planar coils L1 through L4. The planar coils L1 and L2 are connected serially, and the planar coils L3 and L 4 are connected serially, as illustrated in FIG. 6. These two sets of planar coils are connected in parallel. The planar coils L1 through L4 are mutually coupled. The inductance values of the planar coils L1 through L4 are, represented in terms of L1 through L4, L1<L2<L3<L4.

Now, the multiple coils connected serially will be referred to as a "coil group". For example, in the example illustrated in FIG. 6, the planar coils L1 and L2 are a first coil group, and the planar coils L3 and L4 are a second coil group. The composited inductance value of the first coil group is obtained by compositing, of the four inductance values, the smallest inductance value L1 and the second-smallest inductance value L2. The composited inductance value of the second coil group is obtained by compositing, of the four inductance values, the largest inductance value L4 and the second-largest inductance value L3. Accordingly, the composite inductance value of the first coil group is smaller than the composite inductance value of the second coil group.

Thus, there is difference between the composited inductance value of the first coil group and the composited inductance value of the second coil group connected in parallel in the planar coil configuration disclosed in Japanese Unexamined Patent Application Publication No. 2008-205215. This difference will cause balance to be lost between the impedance value of the first coil group and the impedance value of the second coil group when AC power transmission is performed. Imbalance in impedance results in large loss of current flowing through the layered planar coils. It was found that heat is consequently generated in the first coil group of which the impedance is lower, and transmission efficiency drops.

It was discovered in the above example that facing the power receiving device in which the magnetic substance was disposed was generating the difference in the inductance value of the first coil group and the inductance value of the second coil group connected in parallel. However, regardless of whether or not a power receiving device in which the magnetic substance has been disposed is placed, the same problem can occur under conditions where difference occurs between the inductance value of the first coil group and the inductance value of the second coil group connected in parallel.

Based on the above technological knowledge, the present inventors diligently studied a technology to suppress generation of heat and to improve transmission efficiency, focusing on inductance of planar coils. The present inventors arrived at the following embodiments to reduce loss of current flowing through the layered planar coils and improve transmission efficiency, while reducing the thickness of the power transmission device.

A power transmission device according to an aspect of the present disclosure is a power transmission device having a surface a part of which defines a power transmission plane, the device includes: a power transmission circuit converting DC power into AC power; and a power transmission coil structure including 2N planar coils (N is an integer of two or larger) laminated in a direction which is perpendicular to the power transmission plane, the power transmission coil structure wirelessly transmitting the converted AC power to a power receiving coil of a power receiving device via the power transmission plane and being disposed on a side toward the power transmission plane in the power transmission device. The 2N planer coils constitute coil groups including a coil group in which a planar coil having an i'th highest inductance out of the 2N planar coils and a planar coil having an i'th-lowest inductance are connected in series where i denotes any one integer of one to N, and the coil groups are connected in parallel to each other. According to this configuration, a power transmission device that is thin and transmits AC power with high efficiency can be provided.

According to this aspect, the composite inductance values of the coil groups (multiple planar coils serially connected) of the 2N planar coils within the power transmission device, connected in parallel, are averaged so as to be close values.

Specifically, the 2N planar coils make up coil groups where a planar coil having the i'th (where i=1 through N) highest inductance value out of the 2N planar coils, and the planar coil having the i'th-lowest inductance value, are serially connected, so the composite inductance values of the coil groups are averaged so as to be close values.

Accordingly, loss of resistance value balance among the coil groups connected in parallel can be suppressed, so loss of current flowing through the planar coils can be reduced. Consequently, unnecessary generation of heat can be reduced, and transmission efficiency can be improved.

A power transmission device according to another aspect of the present disclosure is a power transmission device having a surface a part of which defines a power transmission plane, the device includes: a power transmission circuit converting DC power into AC power; a power transmission coil structure including M planar coils (M is an integer of three or larger) laminated in a direction which is perpendicular to the power transmission plane, the power transmission coil structure wirelessly transmitting the converted AC power to a power receiving coil of a power receiving device via the power transmission plane and being disposed on a side toward the power transmission plane in the power transmission device. The M planer coils constitute coil groups including a coil group in which two or more planar coils are selected by an order different from the order of magnitude in the inductance values are connected in series, and the coil groups are connected in parallel to each other.

According to this aspect, the M planar coils in the power transmission device have different inductance values. The M planar coils include two or more coil groups where two or more planar coils are selected by an order different from the order of magnitude in inductance values and connected serially as a set.

Accordingly, the composite inductance values of the coil groups are averaged so as to be values as close as possible. Loss of impedance balance among the coil groups connected in parallel can be suppressed, so loss of current flowing through the planar coils can be reduced. Consequently, unnecessary generation of heat can be reduced, and transmission efficiency can be improved.

Also, in the above aspect, there is no need to layer the planar coils such that the inductance values of the planar coils are in the order of L1<L2<L3<L4 from one face of the power transmission antenna to the other face.

Embodiments of the present disclosure will be described below. Note that equivalent components among the embodiments are denoted by the same reference numerals, and that redundant description may be omitted.

First Embodiment

1. Overall Configuration

Figure 7:
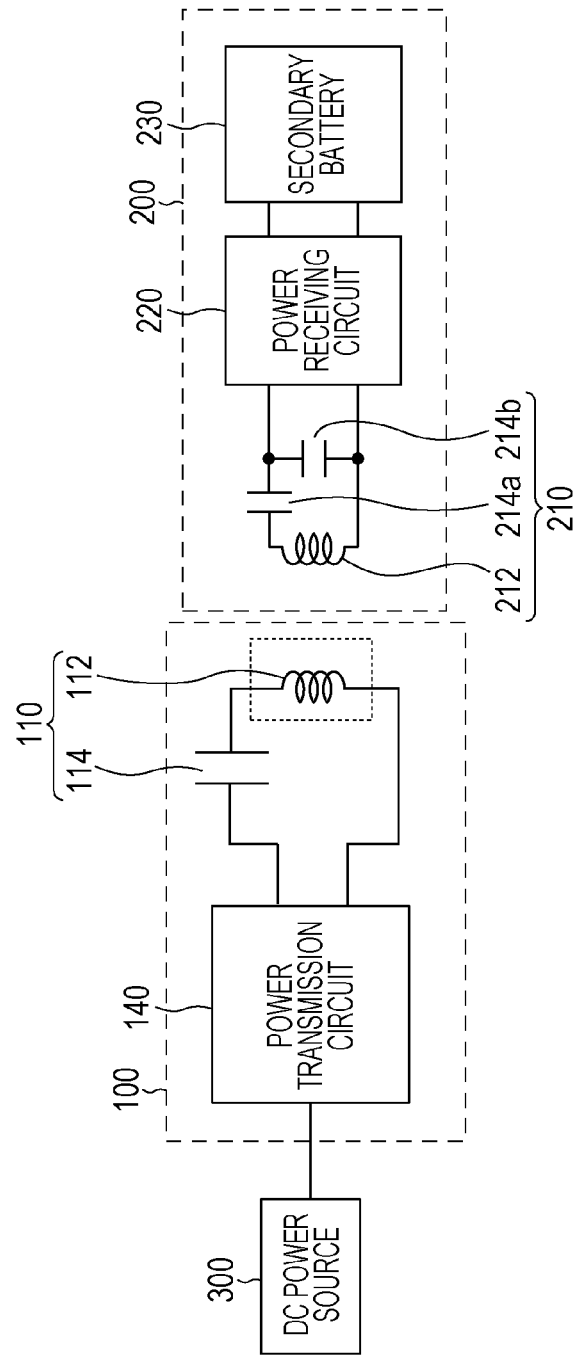
FIG. 7 is a block diagram illustrating an example of a wireless power transmission system.

FIG. 7 is a block diagram illustrating a schematic configuration of a wireless power transmission system according to a first embodiment of the present disclosure. This wireless power transmission system includes the power transmission device 100 and the power receiving device 200. Power is transmitted noncontact from the power transmission antenna 110 of the power transmission device 100 to the power receiving antenna 210 of the power receiving device 200.

The power receiving device 200 includes the power receiving antenna 210 having a power receiving coil 212 and resonance capacitors 214a and 214b, the power receiving circuit 220, and the secondary battery 230. The power receiving coil 212 and the resonance capacitors 214a and 214b make up serial and parallel resonance circuits. The power receiving circuit 220 rectifies and outputs AC power received by the power receiving coil 212. The secondary battery 230 is charged by the DC power output from the power receiving circuit 220. The energy stored in the secondary battery 230 is consumed by a load omitted from illustration.

The power receiving circuit 220 can include various types of circuits, such as a rectifying circuit, frequency conversion circuit, constant-voltage/constant-current control circuit, modem circuit for communication, and so forth. The power receiving circuit 220 is configured such that the received AC energy is converted into DC energy or lower-frequency AC energy that the load can use. Various types of sensors to measure voltage, current, and so forth, output from the power receiving coil 212, may be included in the power receiving circuit 220.

The power transmission device 100 includes the power transmission antenna 110 having a power transmission coil 112 and resonance capacitor 114, and the power transmission circuit 140. The power transmission coil 112 is connected serially with the resonance capacitor 114. The resonance capacitor 114 is connected to the power transmission circuit 140.

The power transmission coil 112 may have a configuration where a plurality of single thin planar coils constituted as a board pattern are layered, for example. Alternatively, wound coils using copper wire, litz wire, twisted wire, or the like, may be employed. The resonance capacitors 114, 214a, and 214b may be provided as necessary. The self-resonant properties of the coils may be used instead of the capacitors.

Figure 8:
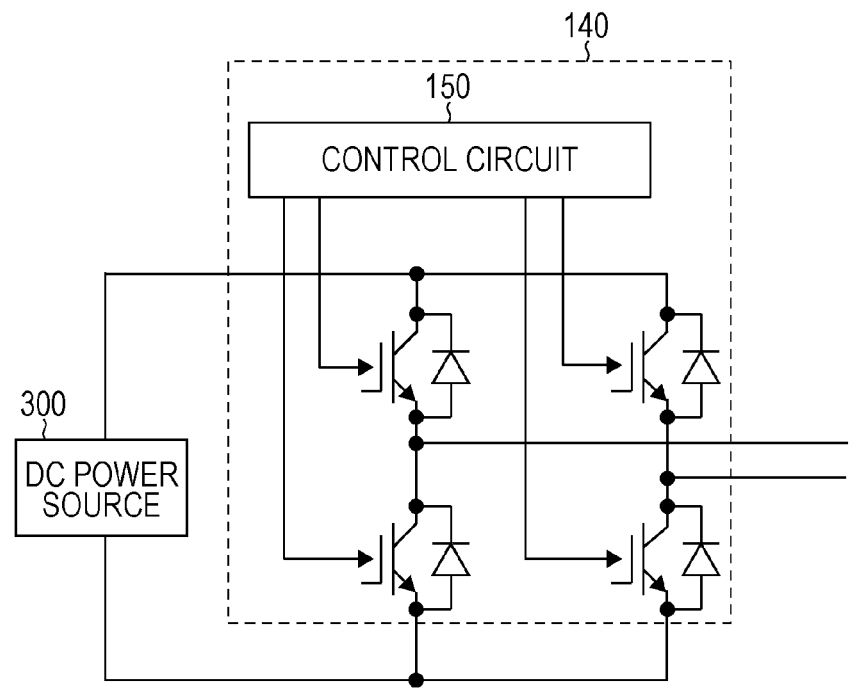
FIG. 8 is a block diagram illustrating an example of a power transmission circuit.

The power transmission circuit 140 includes, for example, full-bridge inverters, class D or class E oscillating circuit, or the like. FIG. 8 illustrates an example in which the power transmission circuit 140 has a full-bridge inverter, and a control circuit 150 for controlling the full-bridge inverter. The power transmission circuit 140 may also include a modem circuit for communication, and various types of sensor for measuring voltage, current, and so forth. The power transmission circuit 140 is connected to an external DC power source 300. The DC power input from the DC power source 300 is converted into AC power and output. This AC power is output into space by the power transmission coil 112.

The frequency when transmitting power is set to the same value as the resonance frequency of the power transmission resonator configured by the power transmission coil 112 and resonance capacitor 114, for example. However, this is not restrictive. For example, the frequency when transmitting power may be set to a value within a range around 85 to 115% of the resonance frequency. The frequency band for power transmission may be set to a value within the range of 100 kHz to 200 kHz for example, but may be set to other values.

The DC power source 300 may be any of a commercial power source, primary battery, secondary battery, solar cell, fuel cell, Universal Serial Bus (USB) power source, large-capacity capacitor (e.g., electric double layer capacitor), a transformer connected to a commercial power source, or a combination thereof.

The power transmission circuit 140 includes the control circuit 150 which is a processor that controls the operations of the entire power transmission device 100. The control circuit 150 can be realized by a combination of a central processing unit (CPU) and memory storing a computer program, for example. The control circuit 150 may be a dedicated integrated circuit configured to realize the operations of the present embodiment. The control circuit 150 performs power transmission control (adjustment of the power transmission state) by the power transmission circuit 140.

The control circuit 150 may include a communication circuit that performs communication with the power receiving device 200. Information indicating change in impedance of the load of the power receiving device 200 can be obtained by a communication circuit, for example. The control circuit 150 may instruct the power transmission circuit 140 to change power transmission parameters based on that information, such that a constant voltage is supplied to the load, for example. Such power transmission parameters may be frequency, phase difference between switching devices of the inverter, or input voltage of the inverter, for example. In a case of adjusting the input voltage, the power transmission circuit 140 may have a DC-DC converter between the DC power source 300 and the inverter. The voltage supplied to the load can be changed by changing these power transmission parameters.

The power transmission device 100 may have components other than the above-described components. For example, the power transmission device 100 may include a display device for display of detection results of a power receiving coil 212, foreign objects, or the like, by the control circuit 150. The display device may be a light source such as a light-emitting diode (LED) or the like. An oscillating circuit and detection coil for detecting foreign objects may also be provided.

The configuration of the power receiving device 200 is not restricted to that illustrated in FIG. 7. The configuration thereof may be optionally designed, as long as provided with the power receiving coil 212 to receive at least part of the energy output from the power transmission coil 112.

2. Configuration of Power Transmission Coil

Next, the configuration of the power transmission coil 112 according to the present embodiment will be described. The power transmission coil 112 is provided on the side toward the power transmission plane 130 within the power transmission device 100, as illustrated in FIGS. 4A through 4C. Note that the power transmission plane 130 here means the face of the power transmission device 100 facing the power receiving device 200 when transmitting power. The power transmission coil 112 includes 2N (where N is a positive integer that is 2 or larger) planar coils having different inductance values. The power transmission coil 112 outputs the AC power output from the power transmission circuit 140 by the 2N planar coils to the power receiving coil 212. The 2N planar coils in the present embodiment make up coil groups, where the planar coil with the i'th (where i=1 through N) highest inductance out of the 2N planar coils, and the planar coil with the i'th lowest inductance, are serially connected. These coil groups are each connected in parallel. The 2N planar coils may be realized by a multi-layered board, where 2N boards are layered, the boards being an insulating board or dialectic board with a conductor pattern wound thereupon, for example. The 2N planar coils are layered perpendicularly to the power transmission plane 130 in the present embodiment. The term "layered perpendicularly to the power transmission plane 130" means that at least part of the planar coils overlap each other when viewing the 2N planar coils from a direction perpendicular to the power transmission plane 130. A detailed configuration of the power transmission coil 112 will be described below, by way of an example where N=2.

Figure 9:
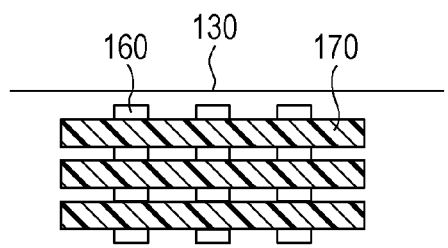
FIG. 9 is a cross-sectional diagram of a power transmission coil according to a first embodiment.

FIG. 9 is a diagram illustrating a partial cross-section of the power transmission coil 112 according to the present embodiment. This example is where four planar coils are constituted by four layers of boards in the case where N=2. This power transmission coil 112 is realized by a multi-layer board upon which are layered planar coils constituted by winding a copper pattern 160 on glass epoxy resin 170 which is an insulating board. The inductance values of the planar coils differ from each other.

Figure 10:
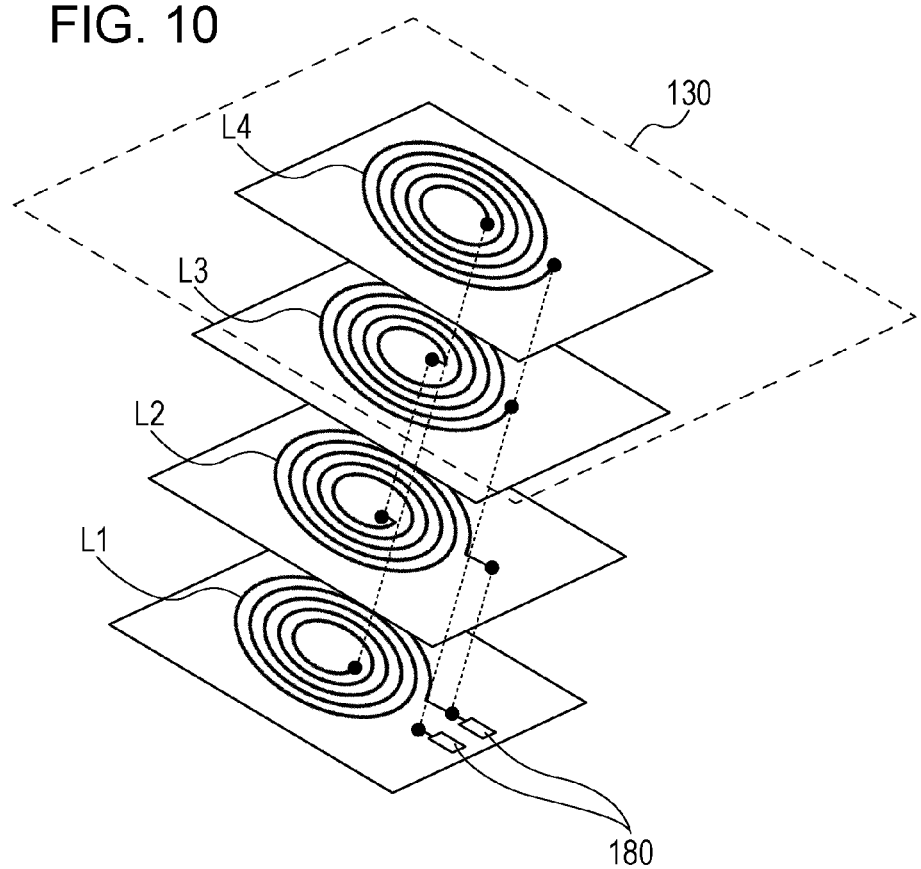
FIG. 10 is a disassembled perspective view of the power transmission coil according to the first embodiment.

FIG. 10 is a disassembled perspective view of the power transmission coil 112 according to the present embodiment. The planar coils at each layer are connected by through holes. The ends of the power transmission coil 112 are connected to terminals 180. The layer of the planar coil L1 farthest from the power transmission plane 130 side will be called the first layer, and thereafter the second layer through the fourth layer, in order. The through hole that connects the inner end of the planar coil L1 of the first layer and the inner end of the planar coil L4 of the fourth layer, and the through hole that connects the inner end of the planar coil L2 of the second layer and the inner end of the planar coil L3 of the third layer, are disposed offset so as to not conduct with each other.

Figure 11:
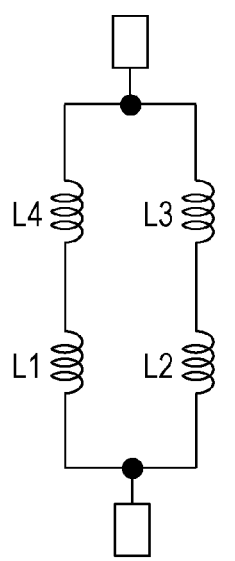
FIG. 11 is an equivalent circuit diagram of the power transmission coil according to the first embodiment.

FIG. 11 is an equivalent circuit diagram of the power transmission coil 112 according to the present embodiment. The planar coils L1 through L4 are coupled with each other, although this is omitted from illustration. As illustrated in FIGS. 10 and 11, the serially-connected planar coils L1 and L4 make up the first coil group, and the serially-connected planar coils L2 and L3 make up the second coil group. The first coil group and the second coil group are connected in parallel. As illustrated in FIG. 11, the order of magnitude of inductance values of the planar coils L1 through L4 is L1<L2<L3<L4. Accordingly, the inductance value of the first coil group made up of the planar coil L4 having the largest inductance value and the planar coil L1 having the smallest inductance value, and the second coil group made up of the planar coil L3 having the second largest inductance value and the planar coil L2 having the second smallest inductance value, are approximately the same values. This can suppress imbalance in impedances of the first coil group and second coil group. As a result, the effects of reduced loss of the power transmission coil 112 in parallel connection are improved.

To verify the effects of the present embodiment, the present Inventors analyzed properties of the power transmission coil according to the first embodiment, where the four planar coils L1 through L4 are connected as illustrated in FIG. 10, under the same conditions as the analysis conditions described with reference to FIG. 5. On the other hand, a power transmission coil properties of a comparative example, where the four planar coils L1 through L4 were connected as illustrated in FIG. 2, were analyzed. Table 2 illustrates the analysis results of composite inductance L and AC resistance R of the power transmission coils according to the first embodiment and the comparative example.

TABLE 2

| f = 150 kHz | L [µH] | R [mOhm] | |
|---|---|---|---|
| Comparative example | 26.00 | 850 | 0.0% |
| First embodiment | 25.99 | 815 | −4.1% |

As can be seen from Table 2, while the value of inductance L does not change much, the value of the AC resistance R is reduced by 4.1% in the first embodiment as compared to the comparative example. It can thus be seen that the configuration according to the present embodiment suppresses unnecessary generation of heat, and enables improved transmission efficiency.

Second Embodiment

Figure 12:
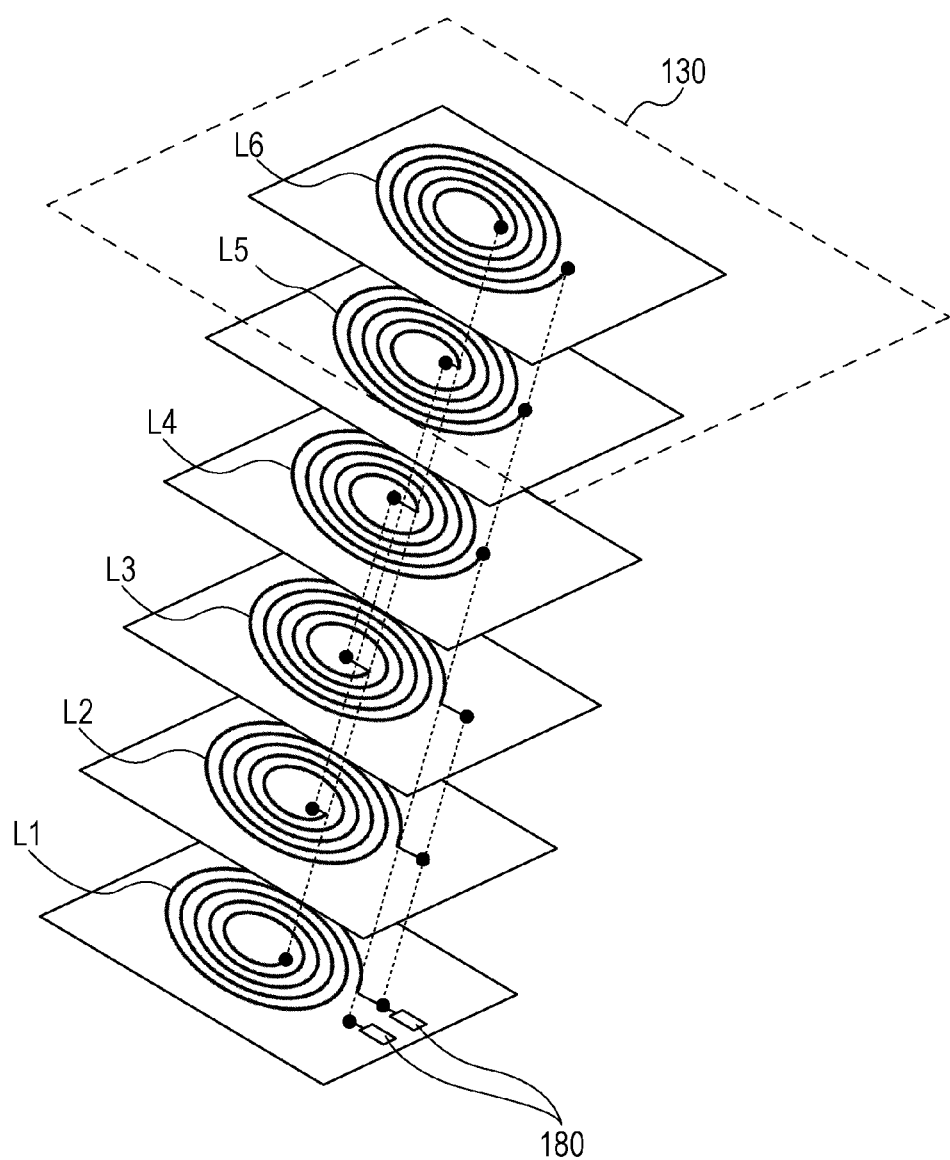
FIG. 12 is a disassembled perspective view of a power transmission coil according to a second embodiment.
Figure 13:
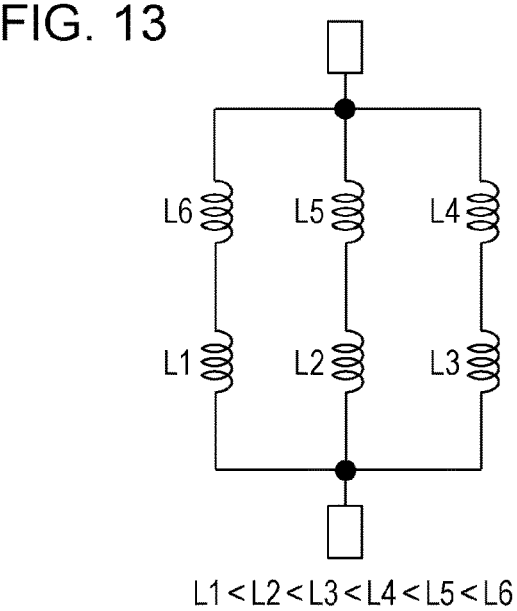
FIG. 13 is an equivalent circuit diagram of a power transmission coil according to the second embodiment.

FIG. 12 is a disassembled perspective view illustrating the configuration of the power transmission coil 112 according to a second embodiment of the present disclosure. FIG. 13 is an equivalent circuit diagram of the power transmission coil 112 according to the present embodiment. The power transmission coil 112 according to the present embodiment differs from the first embodiment with regard to the point that N=3, i.e., the power transmission coil 112 has six planar coils. Components which are in common with or equivalent to those in the first embodiment will be denoted by the same reference numerals, and description of common matter will not be repeated.

The power transmission coil 112 according to the present embodiment employs a configuration where six layers are in triple parallel array, to further reduce loss in comparison with the first embodiment. The power transmission coil 112 according to the present embodiment has six planar coils L1 through L6, as illustrated in FIGS. 12 and 13. The planar coils L1 and L6 are serially connected, thus making up a first coil group. The planar coils L2 and L5 are serially connected, thus making up a second coil group. The planar coils L3 and L4 are serially connected, thus making up a third coil group. The first through third coil groups are connected in parallel. The order of magnitude of inductance values of the multiple planar coils L1 through L6 is L1<L2<L3<L4<L5<L6. Accordingly, the first coil group is made up of the planar coil L6 having the largest inductance value and the planar coil L1 having the smallest inductance value. The second coil group is made up of the planar coil L5 having the second largest inductance value and the planar coil L2 having the second smallest inductance value. The third coil group is made up of the planar coil L4 having the third largest inductance value and the planar coil L3 having the third smallest inductance value. Accordingly, the inductance values of the first through third coil groups (composited inductance values) are approximately the same.

Thus, the present embodiment also can suppress imbalance in impedances of the first coil group through third coil group. As a result, the effects of reduced loss of the power transmission coil 112 in parallel connection are improved.

While the present embodiment has been described with N=3, N=4, or of N>4 may be employed. Further effects of loss reduction can be anticipated by increasing the number of layers and parallel connections within a range in which the thickness of the power transmission coil 112 can be tolerated.

Third Embodiment

A third embodiment of the present disclosure will be described next. The power transmission coil 112 according to the present embodiment includes M planar coils (where M is a positive integer of 3 or larger) having different inductance values. The M planar coils make up two or more coil groups, including a coil group where a set of two or more planar coils have been selected by an order different from the order of magnitude in inductance values, and connected serially as one set. The two or more coil groups are connected in parallel. The term "an order different from the order of magnitude in inductance values" means that there at least partially is a portion of an order arrayed different from the array of magnitude in inductance values. As an example, in a case where M≥4, a case can be assumed where the planar coil having the highest inductance value, the planar coil having the second greatest highest inductance value, and the planar coil having the fourth greatest highest inductance value, make up one coil group. In this case, the array of the planar coil having the second greatest highest inductance value and the planar coil having the fourth greatest highest inductance value is different from the array of the order of magnitude in inductance values. Accordingly, this order falls under "an order different from the order of magnitude in inductance values". Hereinafter, the present embodiment will be described by way of an example where M=4.

Figure 14:
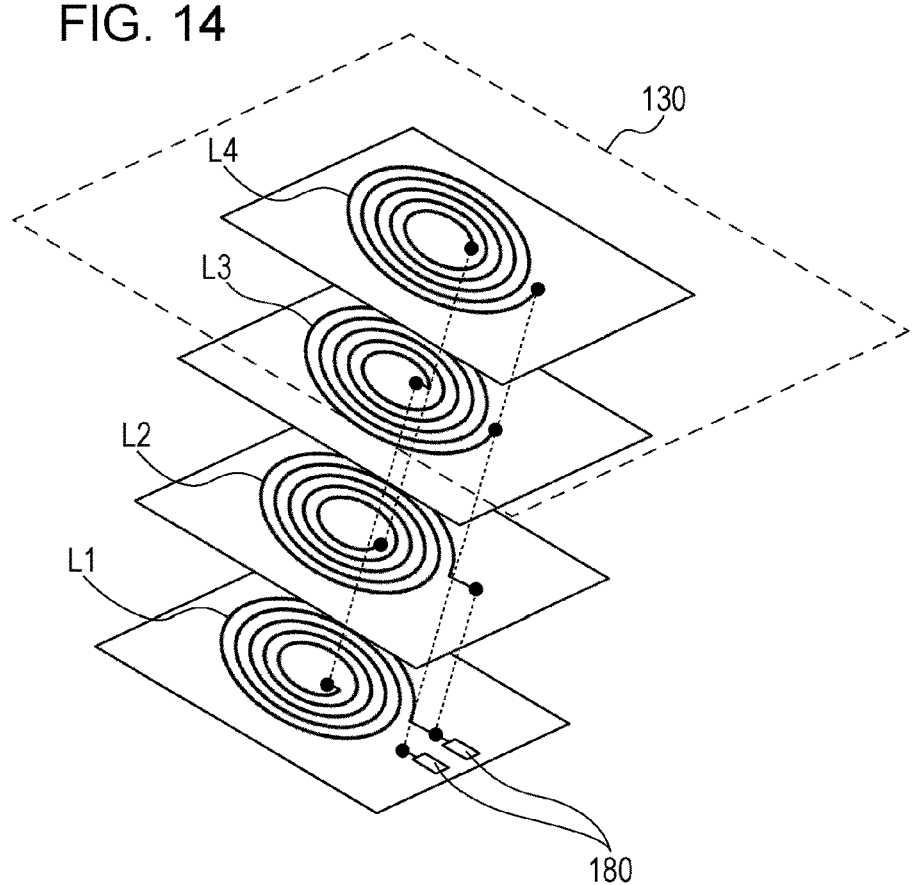
FIG. 14 is a disassembled perspective view of the power transmission coil according to a third embodiment.
Figure 15:
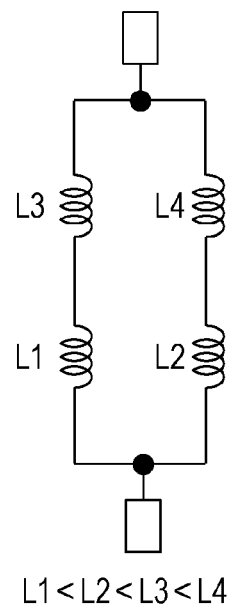
FIG. 15 is an equivalent circuit diagram of a power transmission coil according to the third embodiment.

FIG. 14 is a disassembled perspective view illustrating the configuration of the power transmission coil 112 in a case where M=4. FIG. 15 is an equivalent circuit diagram of this power transmission coil 112. As illustrated in FIGS. 14 and 15, the power transmission coil 112 according to the present embodiment has four planar coils L1 through L4. The planar coils L1 and L3 are serially connected, and make up a first coil group. The planar coils L2 and L4 are serially connected, and make up a second coil group. The first and second coil groups are connected in parallel. The order of magnitude in inductance from planar coils L1 through L4 is L1<L2<L3<L4. Thus, the inductance value of the first coil group made up of the planar coils L1 and L3, and the inductance value of the second coil group made up of the planar coils L2 and L4, are averaged. That is to say, by serially connecting planar coils having a different order from the order of magnitude in inductance values, the inductance values of the first and second coil groups are averaged. This can suppress imbalance in impedances of the first coil group and second coil group. As a result, the effects of reduced loss of the power transmission coil 112 in parallel connection are improved.

To verify the effects of the present embodiment, the present Inventors analyzed the properties of power transmission coil according to the third embodiment, where the four planar coils L1 through L4 are connected as illustrated in FIG. 14, under the same conditions as the analysis conditions described with reference to FIG. 5. Table 3 illustrates the analysis results of composite inductance L and AC resistance R of the power transmission coils according to the third embodiment and the comparative example.

| f = 150 kHz | L [μH] | R [mOhm] | |
|---|---|---|---|
| Comparative example | 26.00 | 850 | 0.0% |
| Third embodiment | 25.99 | 807 | −5.1% |

As can be seen from Table 3, while the value of inductance L does not change much, the value of the AC resistance R is reduced by 5.1% in the third embodiment as compared to the comparative example. It can thus be seen that the configuration according to the present embodiment suppresses unnecessary generation of heat, and enables improved transmission efficiency.

Figure 16:
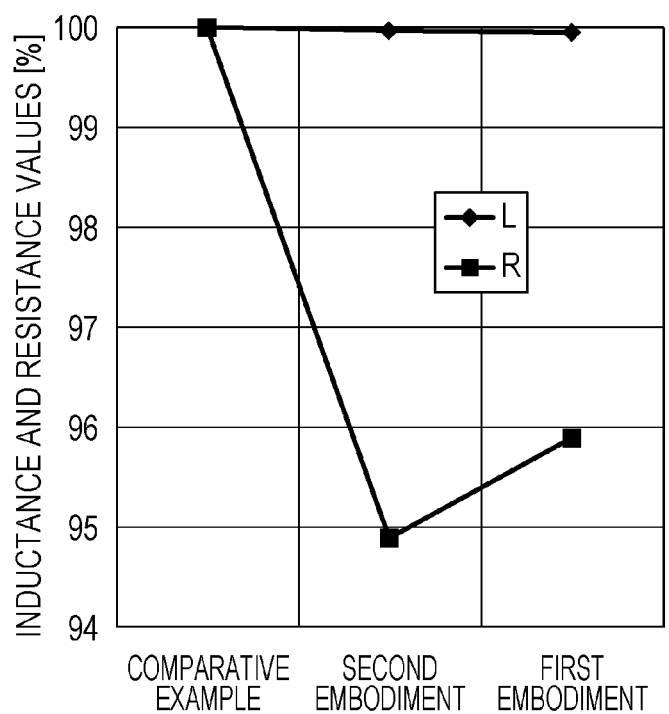
FIG. 16 is a graph illustrating properties of the power transmission coils according to the first embodiment (first example) and third embodiment (second example)

FIG. 16 is a graph illustrating the result of having compared the power transmission coil properties of the present embodiment and the first embodiment with the power transmission coil properties of the comparative example. It can be seen that by changing the connections of the planar coils L1 through L4 to be different from the connections according to the comparative example, reduction of the AC resistance R in particular is realized.

Fourth Embodiment

Figure 17:
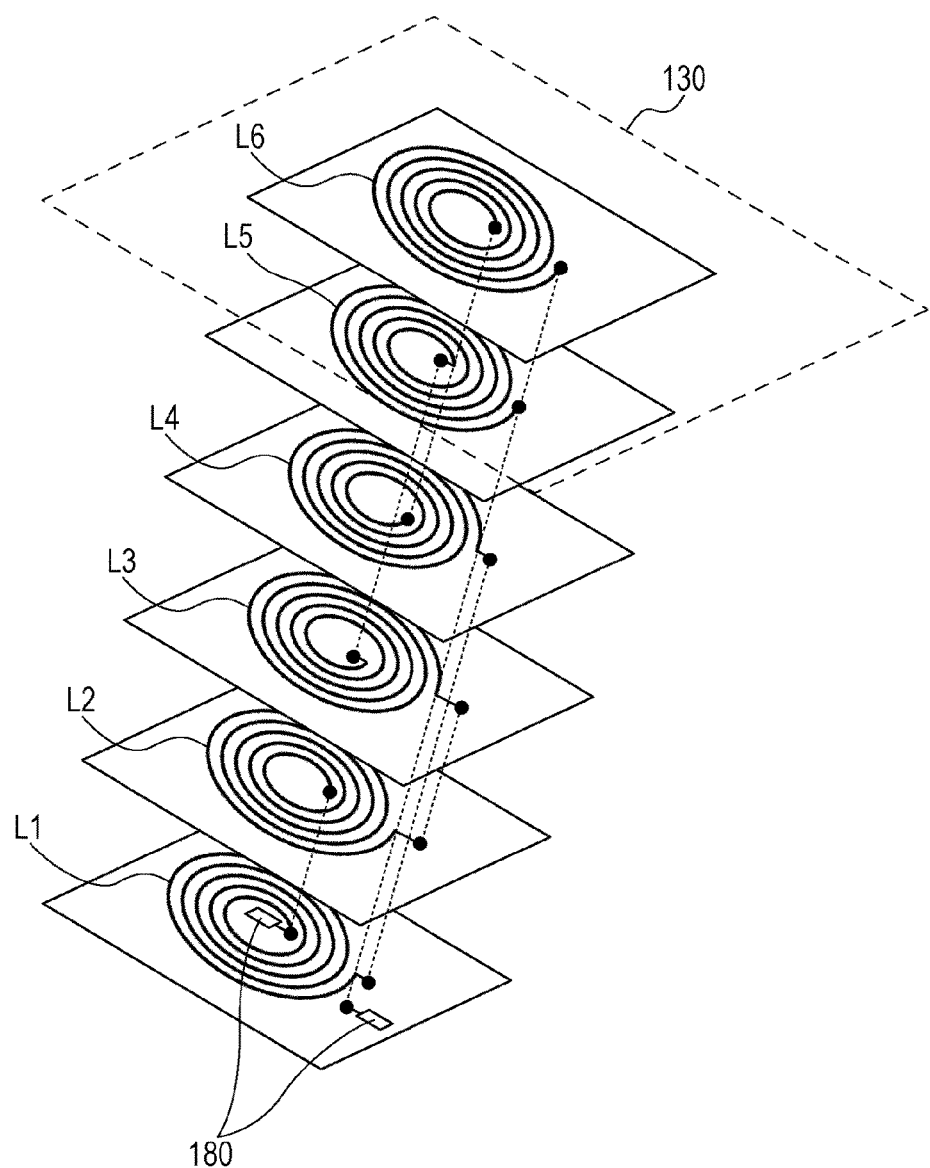
FIG. 17 is a disassembled perspective view of a power transmission coil according to a fourth embodiment.
Figure 18:
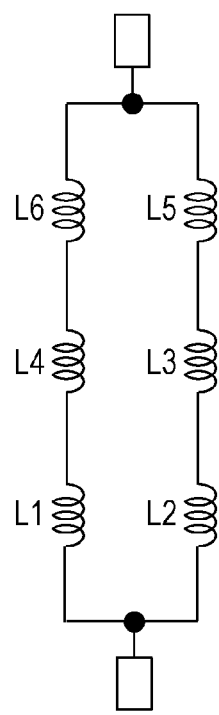
FIG. 18 is an equivalent circuit diagram of the power transmission coil according to the fourth embodiment.

FIG. 17 is a disassembled perspective view illustrating the configuration of the power transmission coil 112 according to a fourth embodiment of the present disclosure. FIG. 18 is an equivalent circuit diagram of the power transmission coil 112 according to the present embodiment. The power transmission coil 112 according to the present embodiment differs from the third embodiment with regard to the point that M=6, i.e., the power transmission coil 112 has six planar coils. Description of matter common with the third embodiment will not be repeated below.

The power transmission coil 112 according to the present embodiment has six planar coils L1 through L6, as illustrated in FIGS. 17 and 18. The planar coils L1, L4, and L6 are serially connected, thus making up a first coil group. The planar coils L2, L3, and L5 are serially connected, thus making up a second coil group. The first and second coil groups are connected in parallel. The order of magnitude of inductance values of the planar coils L1 through L6 is L1<L2<L3<L4<L5<L6. Accordingly, the first coil group is made up of the planar coil L1 having the smallest inductance value, the planar coil L4 having the fourth smallest inductance value, and planar coil L6 having the sixth smallest inductance value. The second coil group is made up of the planar coil L2 having the second smallest inductance value, the planar coil L3 having the third smallest inductance value, and planar coil L5 having the fifth smallest inductance value. Thus, the inductance values of the first and second coil groups are averaged, and are close to each other. Accordingly, the present embodiment also can suppress imbalance in impedances of the first coil group and second coil group.

As a result, the effects of reduced loss of the power transmission coil in parallel connection are improved.

In the present embodiment and the third embodiment, of the multiple planar coils serially connected that make up each of the multiple coil groups, at least one set of planar coils is selected according to an order different from the order of inductance values. Accordingly, the inductance values of the coil groups are averaged. For example, in the configuration illustrated in FIG. 18, the planar coil L2 and planar coil L3 making up the second coil group are connected in the order of inductance values, but the planar coil L3 and planar coil L5 are connected different from the order of inductance values. Accordingly, the inductance values of the first and second coil groups are averaged, and the effects of reduced loss are improved.

While M=6 in the present embodiment, M≥7 may be employed. Further effects of loss reduction can be anticipated by increasing the number of layers and parallel connections within a range in which the thickness of the power transmission coil 112 can be tolerated.

Modification

The above-described embodiments assume a case where the power receiving device 200 in which the magnetic substance 250 has been disposed is placed facing the power transmission device 100. However, the present disclosure is not restricted to such cases. The technology according to the present disclosure is valid in any state where difference occurs in inductance of multiple planar coils included in the power transmission coil 112. An example of such a state is a case where at least one of the size and number of winds of the planar coils is different.

Figure 19:
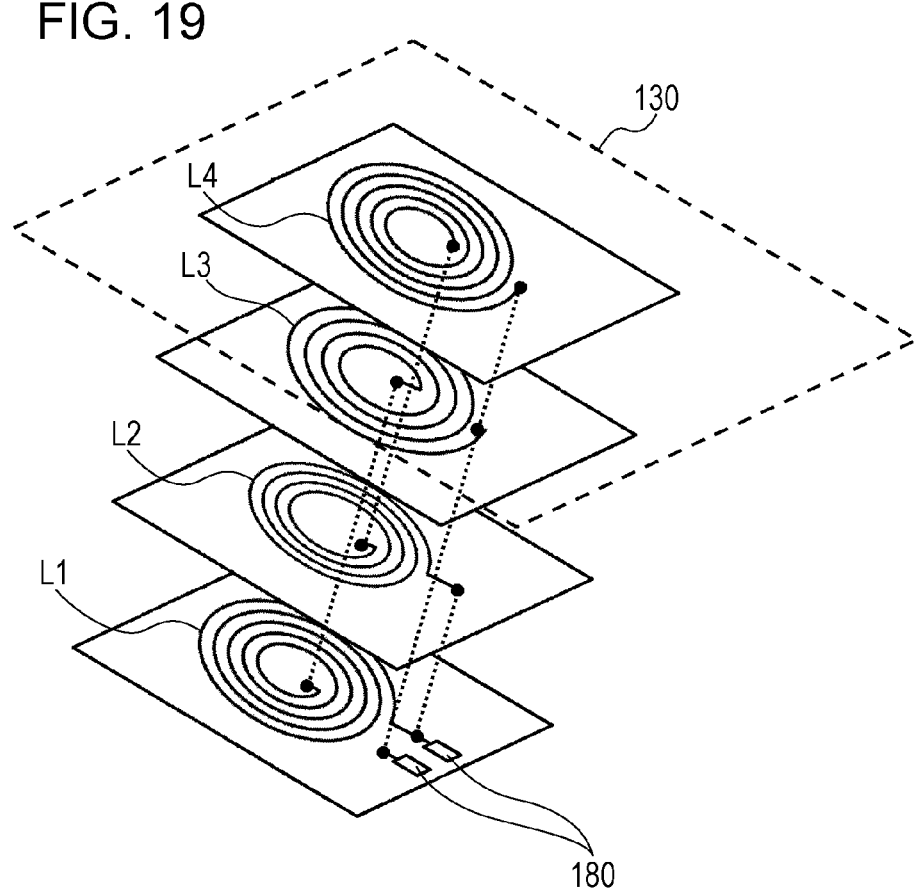
FIG. 19 is a disassembled perspective view illustrating an example of a power transmission coil where the numbers of winds of the planar coils differ.
Figure 20:
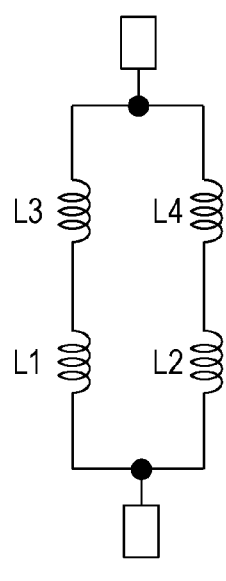
FIG. 20 is an equivalent circuit diagram of the power transmission coil illustrated in FIG. 19.

FIG. 19 is a disassembled perspective view illustrating an example of a power transmission coil 112 where the numbers of winds of the planar coils differ. FIG. 20 is an equivalent circuit diagram of this power transmission coil 112. The power transmission coil according to the present disclosure can be applied to cases where the sizes or number of winds of the planar coils differ, as illustrated in FIG. 19. In the power transmission coil 112 illustrated in FIG. 19, the planar coils L2 and L3 have fewer winds than the planar coils L1 and L4. The planar coil L2 has the number of winds reduced from the outer side, while the planar coil L3 has the number of winds reduced from the inner side. The order of magnitude of inductance values of the planar coils L1 through L4 is L2<L3<L1<L4 in a case where the power receiving device having the magnetic substance is placed facing this power transmission coil 112.

In this example, the first coil group is configured by the planar coils L1 and L3 being serially connected, and the second coil group is configured by the planar coils L2 and L4 being serially connected, as illustrated in FIGS. 19 and 20. The first and second coil groups are connected in parallel. Accordingly, the first coil group is made up of the planar coil L1 having the second largest inductance value and the planar coil L3 having the third largest inductance value. The second coil group is made up of the planar coil L4 having the largest inductance value and the planar coil L2 having the fourth largest inductance value. Accordingly, the inductance values of the first and second coil groups are approximately the same. Thus, imbalance in impedances of the first coil group and second coil group can be suppressed. As a result, the effects of reduced loss of the power transmission coil 112 in parallel connection are improved.

Figure 21:
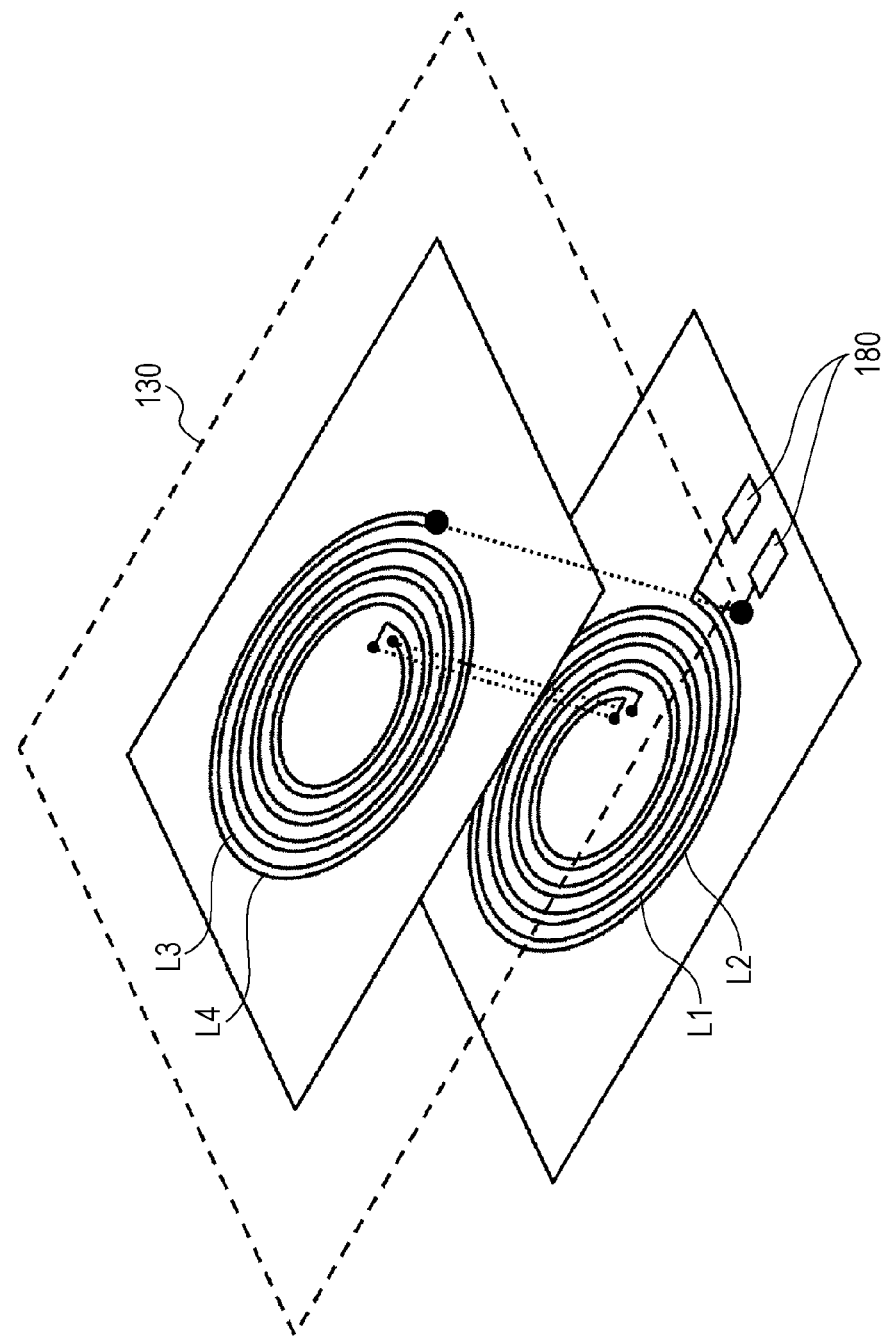
FIG. 21 is a perspective view illustrating an example of a power transmission coil constituted by overlaying two planar coils on the same plane.

FIG. 21 is a perspective view illustrating an example of a power transmission coil constituted by overlaying two planar coils on the same plane. In this way, multiple layers may be constituted and layered, in each of which two or more (two in the example in FIG. 21) planar coils are constituted on the same plane. In this example, 2N planar coils are sectioned in increments of layers. Multiple planar coils are disposed in each layer. The layers are layered perpendicularly to the power transmission plane 130. The effects of reduced loss of the power transmission coil 112 can be improved in such a configuration as well, by connecting the planar coils taking into consideration the magnitude of inductance values. The equivalent circuit diagram of the power transmission coil 112 illustrated in FIG. 21 is the same as that in FIG. 11.

Figure 22A:
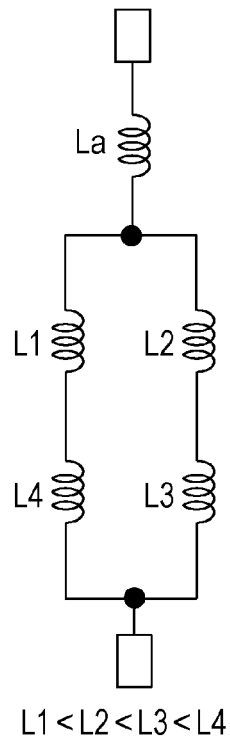
FIG. 22A is an equivalent circuit diagram illustrating a modification where another planar coil is connected in series to the power transmission coil according to the first embodiment.
Figure 22B:
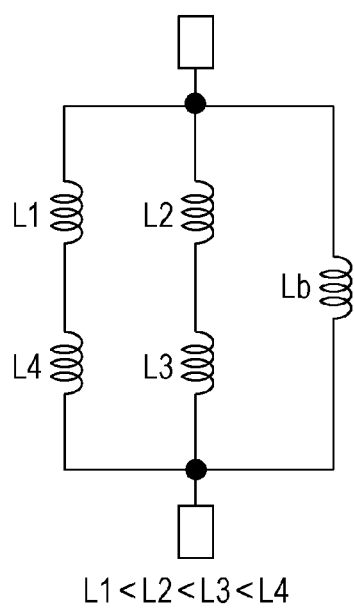
FIG. 22B is an equivalent circuit diagram illustrating a modification where another planar coil is connected in parallel to the power transmission coil according to the first embodiment.

Further, additional planar coils may be layered anew on the multiple planar coils in the above-described embodiments, and connected serially or in parallel. FIG. 22A is an equivalent circuit diagram illustrating a modification where a planar coil La is connected in series to the power transmission coil 112 according to the first embodiment. FIG. 22B is an equivalent circuit diagram illustrating a modification where a planar coil Lb is connected in parallel to the power transmission coil 112 according to the first embodiment. In a case where there is need for fine adjustment of inductance in the circuit design of the wireless power transmission system, configurations such as in FIGS. 22A and 22B are effective. Addition of a new planar coil is not restricted to the configuration of the first embodiment, and may be added to the configurations of the second through fourth embodiments and the above-described modification as well. Although omitted from illustration, the number of newly added planar coils does not have to be one. For example, one each may be added serially and in parallel, or two serially, or two in parallel, may be added. While this modification has been described primarily based on the configuration of the first embodiment, this is not restrictive. Similar modifications may be made to the other embodiments as well.

Fifth Embodiment

Figure 23A:
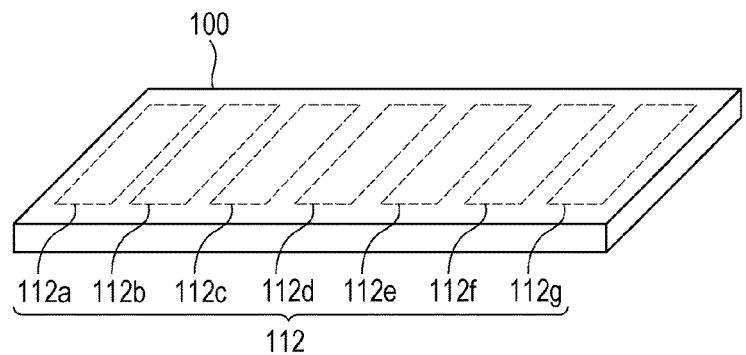
FIG. 23A is a perspective view illustrating a power transmission device according to a fifth embodiment.
Figure 23B:
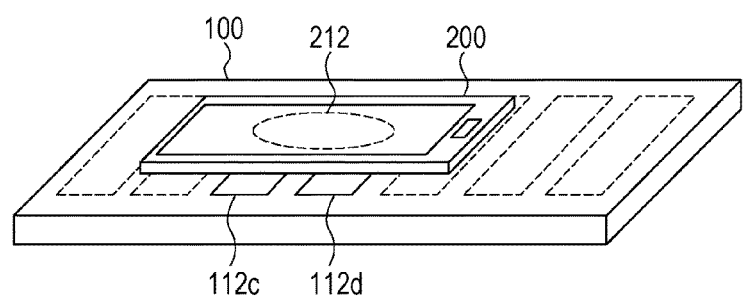
FIG. 23B is a perspective view illustrating a state where a power receiving device is placed on the power transmission device according to the fifth embodiment.
Figure 23C:
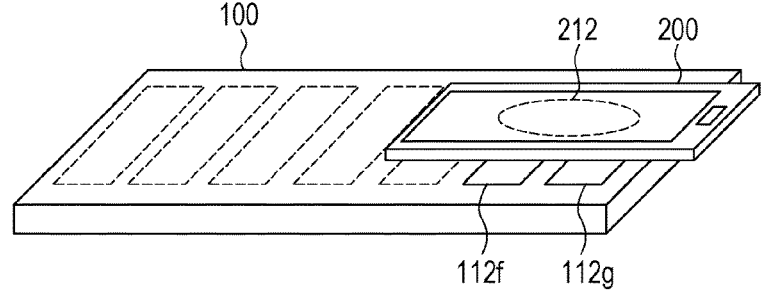
FIG. 23C is a perspective view illustrating another state where a power receiving device is placed on the power transmission device according to the fifth embodiment.

A fifth embodiment will be described next, relating to a power transmission device 100 having multiple power transmission coils 112. FIGS. 23A through 23C are diagrams illustrating the external appearance and operations of the power transmission device 100 according to the fifth embodiment. This power transmission device 100 is a wireless charger, shaped in the form of a flat plate. The power transmission device 100 has multiple power transmission coils 112 (the seven of power transmission coils 112a through 112g in this case) arrayed in a single row, as illustrated in FIG. 23A. The power transmission coils have the configuration of any of the above-described embodiments, where multiple planar coils have been layered. Each power transmission coil has a shape that is short in the array direction (sideways direction in FIGS. 23A through 23C) and long in the direction perpendicular to the array direction. The power transmission device 100 also includes a power transmission circuit that supplies AC power to the power transmission coils, and a control circuit that controls the connection state between the power transmission circuit and the power transmission coils, although omitted from illustration.

Upon a power receiving device 200 having a power receiving coil 212 coming into proximity with the power transmission device 100, the control circuit electrically connects the two power transmission coils closest to the power receiving coil 212, to the power transmission circuit. In the state illustrated in FIG. 23B, the power transmission coils 112c and 112d alone are connected to the power transmission circuit. In the state illustrated in FIG. 23C, the power transmission coils 112f and 112g alone are connected to the power transmission circuit. Although two power transmission coils constantly receive supply of power in this example, the number of power transmission coils which are supplied with power at the same time may be a number other than two. The number of power transmission coils to which power is supplied at the same time may be any number, as long as smaller than the total number of power transmission coils.

Figure 24:
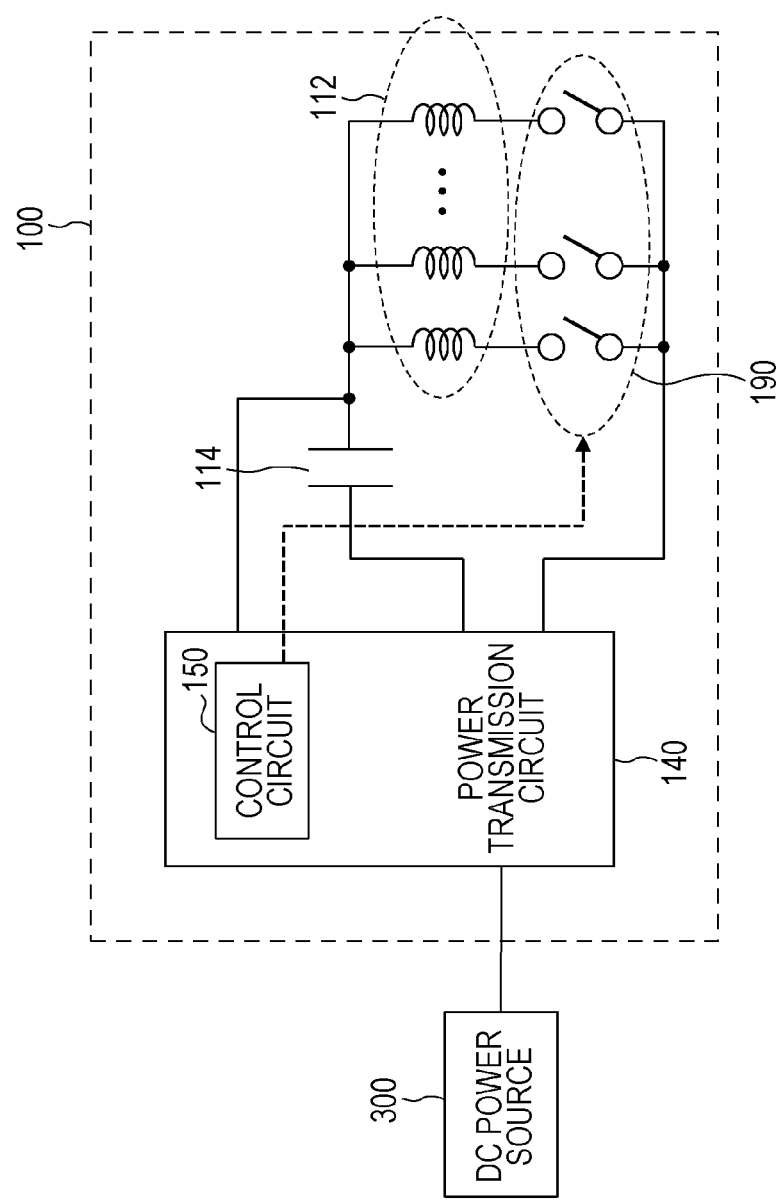
FIG. 24 is a diagram illustrating a schematic configuration of the power transmission device according to the fifth embodiment.

FIG. 24 is a block diagram illustrating a schematic configuration of the power transmission device 100 according to the present embodiment. Components which are in common with or equivalent to those in FIG. 7 will be denoted by the same reference numerals, and description of common matter will not be repeated.

The power transmission device 100 includes multiple power transmission coils 112, multiple switches 190, the resonance capacitor 114, and the power transmission circuit 140. The power transmission circuit 140 includes the control circuit 150. The multiple switches 190 are connected to the multiple power transmission coils 112, respectively. The term "connected" here means to be connected so as to be electrically conducting. The multiple power transmission coils 112 are connected to the power transmission circuit 140 via the multiple switches 190, and are parallel to each other. One end of each power transmission coil is connected to one electrode of the resonance capacitor 114. The electrode at the other end of the resonance capacitor 114 is connected to the power transmission circuit 140. The multiple switches 190 are each connected to the terminals of the multiple power transmission coils 112 where the resonance capacitor 114 is not connected. The reason is that the fluctuation in voltage between the resonance capacitor 114 and the multiple power transmission coils 112 is great.

The control circuit 150 detects the relative position of the power receiving coil 212 as to the multiple power transmission coils 112. Detection of a foreign object such as metal approaching the power transmission coil 112 may be detected as well. Detection of the position of the power receiving coil 212 and detection of a foreign object is performed based on measurement values of parameters that change in accordance with change in impedance, such as voltage, current, frequency, inductance, and so forth, on the circuit. More specifically, the control circuit 150 turns a certain number (e.g., two) of the multiple switches 190 on in order, and measures one of the parameters listed above. In a case where a value off from a stipulated range is measured, determination can be made that a power receiving coil 212 or foreign object is present near the power transmission coil to which power is being supplied at that time. The control circuit 150 may have a detection circuit that is omitted from illustration, to enable such detection. Detection of a power receiving coil 212 or foreign object in the present disclosure is not restricted to any particular method, and can be performed using any known method.

The control circuit 150 selects two power transmission coils to use for transmission of power, in accordance with the relative position of the power receiving coil 212 as to the multiple power transmission coils 112. The control circuit 150 then switches the conducting states of the multiple switches 190 so that AC power from the power transmission circuit 140 is only supplied to the two selected power transmission coils. As a result, AC energy is output into space for the two selected power transmission coils.

The power transmission device 100 has multiple power transmission coils in the present embodiment. Accordingly, the range over which power transmission can be realized is broader than a configuration having a single power transmission coil. Accordingly, positioning with the power receiving device 200 can be easily performed.

Other Embodiments

The technology of the present disclosure is not restricted to the above-described embodiments; rather, various modifications can be made. The following is a description of examples of other embodiments.

Figure 25:
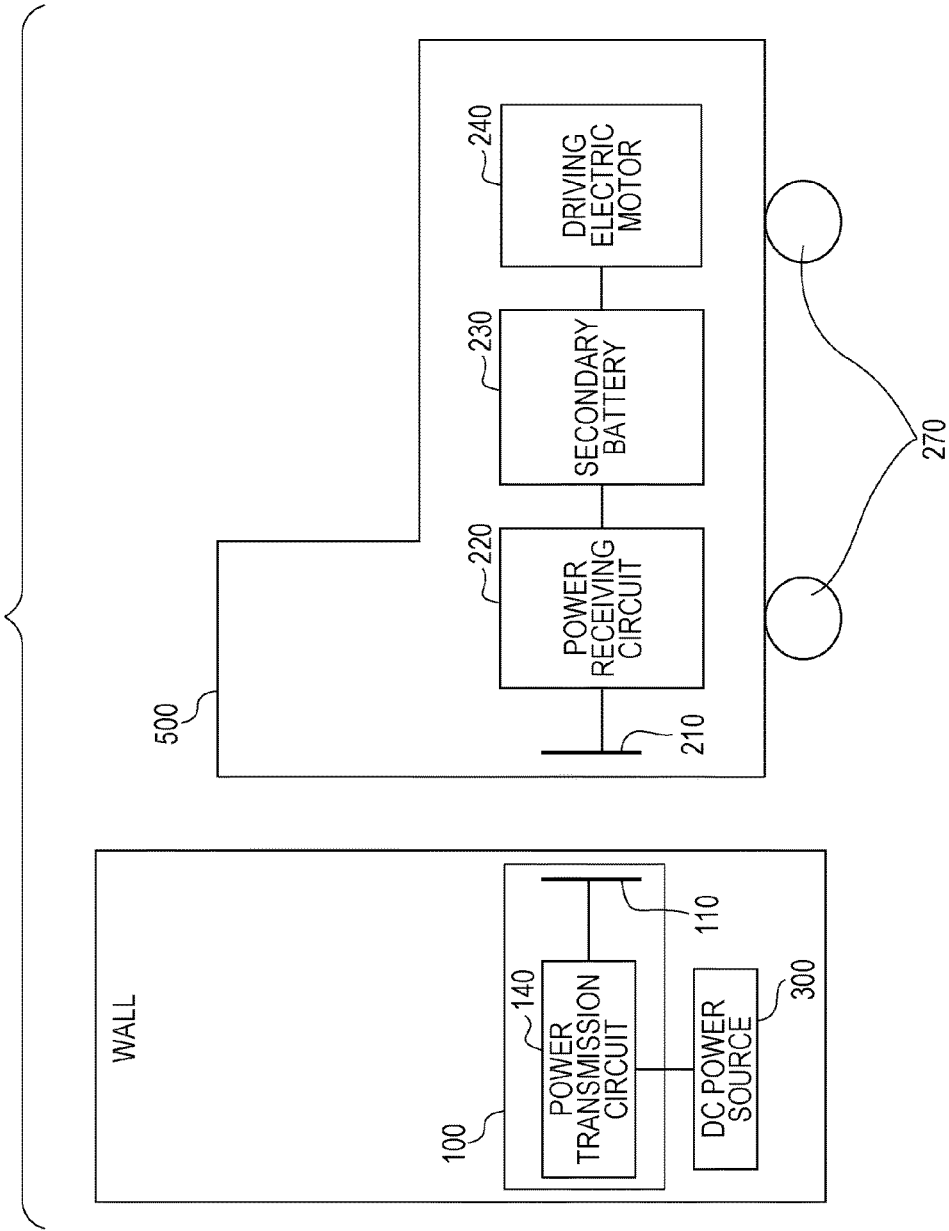
FIG. 25 is a diagram illustrating an example of a wireless power transmission system.

FIG. 25 is a diagram illustrating a configuration example of a wireless power transmission system where electric power is transmitted noncontact from a wall to a robot 500 used in hospitals and the like. In this example, the power transmission device 100 is embedded in a wall. The robot 500 has the same components as the power receiving device 200 illustrated in FIGS. 4A through 4C or in FIG. 7. Further, the robot 500 includes a driving electric motor 240, and multiple wheels 270 for movement. With such a system, a hospital robot 500, for example, can be automatic charged without human intervention, by noncontact power transmission from the wall. Note that the same configuration can also be applied to electric vehicles such as electric cars and so forth, instead of the robot 500.

Figure 26:
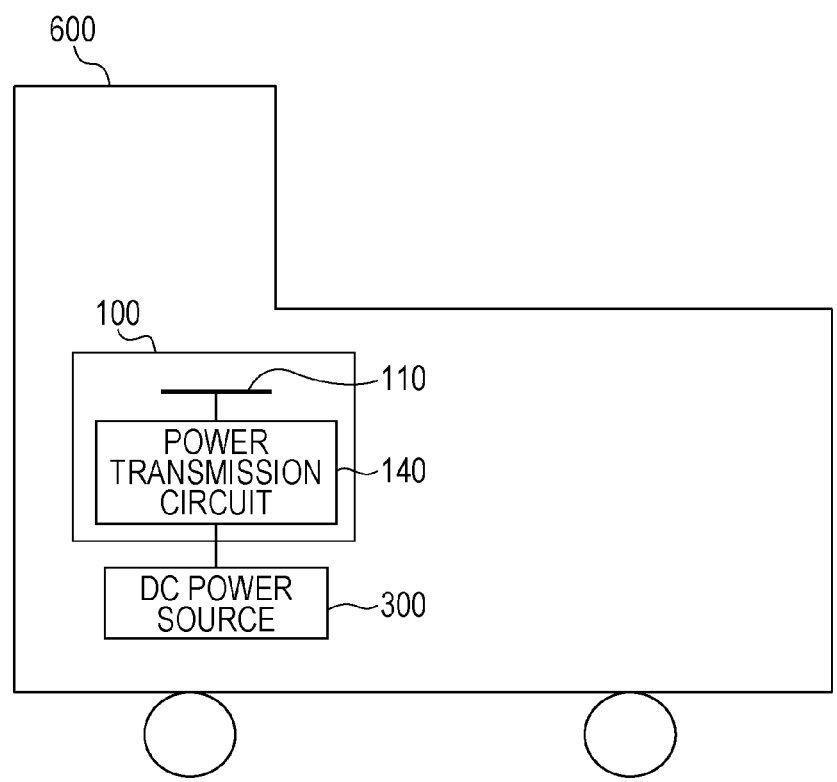
FIG. 26 is a diagram illustrating an example of a vehicle equipped with a power transmission device.

FIG. 26 is a block diagram schematic illustrating a vehicle 600 in which is mounted the power transmission device 100 according to the present disclosure, the vehicle 600 has the power transmission device 100 installed in the console box 400 illustrated in FIG. 1, for example. Accordingly, a user can charge electronic devices such as cellular phones and the like in the vehicle 600.

While the power transmission coil in the above-described embodiments have multiple planar coils that have been layered, the power receiving coil may have multiple planar coils in the same way. A situation in which inductance values of multiple planar coils differ from each other can occur in the power receiving device as well, so applying the configuration of the coil according to the present disclosure is effective.

Figure 27:
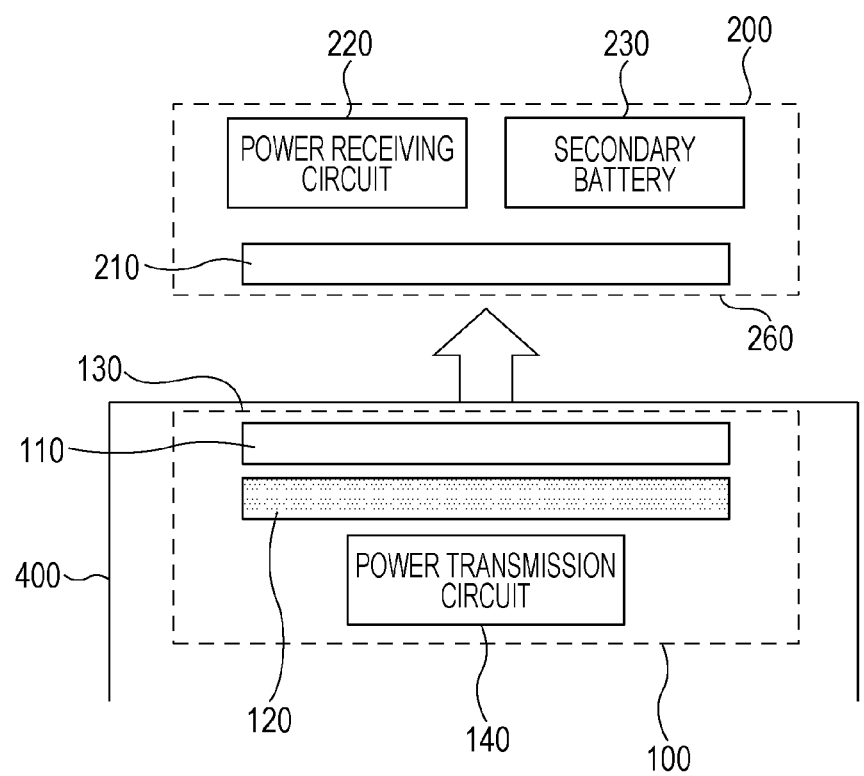
FIG. 27 is a cross-sectional view illustrating a configuration example of a power receiving device having multiple planar coils that are layered.

FIG. 27 is a cross-sectional diagram illustrating an example of a wireless power transmission system having such a power receiving device 200. In this example, the power receiving device 200 includes a power receiving plane 260 to receive power from the power transmission device 100, a power receiving circuit 220 that converts received AC power into DC power, and at least one power receiving coil (part of the power receiving antenna 210) disposed within the power receiving device 200 toward the side of the power receiving plane 260. The at least one power receiving coil includes 2N (where N is a positive integer or 2 or larger) planar coils having different inductance values and outputs AC power input from the power receiving plane 260 to the power receiving circuit 220. The planar coil having the i'th (where i=1 through N) highest inductance value out of the 2N planar coils, and the planar coil having the i'th-lowest inductance value, are serially connected to each other and make up a coil group. These coil groups are each connected in parallel. Note that the power receiving plane here means the face of the power receiving device 200 facing the power transmission plane 130 of the power transmission device 100 when receiving power.

Instead of the above configuration, the at least one power receiving coil may include M (where M is a positive integer of 3 or larger) planar coils having difference inductance values, and the M planar coils may include two or more coil groups including a coil group which has two or more planar coils selected in an order different from the order of magnitude of inductance values, connected serially as one set. In this case as well, the two or more coil groups are each connected in parallel.

Note that in the example illustrated in FIG. 27, the power transmission device 100 internally includes a magnetic substance 120 on the opposite side of the power transmission coil from the power transmission plane 130. Accordingly, the inductance values of the multiple planar coils layered within the power receiving antenna 210 tends to be higher the closer to the magnetic substance 120. Accordingly, applying the configuration of the multiple planar coils layered according to any one of the above-described embodiments in the power receiving coil within the power receiving antenna 210 is effective. In this example, the power transmission coil within the power transmission antenna 110 may include multiple planar coils layered according to any one of the above-described embodiments, or may be a conventional power transmission coil. The power transmission device 100 does not have to include the magnetic substance 120.

The present Inventors arrived at the following aspects in order to reduce loss due to current flowing through the layered planar coils and improve transmission efficiency.

(1) A power transmission device according to a first aspect of the present disclosure is a power transmission device having a surface a part of which defines a power transmission plane, the device includes: a power transmission circuit converting DC power into AC power; and a power transmission coil structure including 2N planar coils (N is an integer of two or larger) laminated in a direction which is perpendicular to the power transmission plane, the power transmission coil structure wirelessly transmitting the converted AC power to a power receiving coil of a power receiving device via the power transmission plane and being disposed on a side toward the power transmission plane in the power transmission device. The 2N planer coils constitute coil groups including a coil group in which a planar coil having an i'th highest inductance out of the 2N planar coils and a planar coil having an i'th-lowest inductance are connected in series where i denotes any one integer of one to N, and the coil groups are connected in parallel to each other.

According to the above aspect, the composite inductance values of the coil groups (multiple planar coils serially connected) of the 2N planar coils within the power transmission device, connected in parallel, are averaged so as to be close values.

Specifically, the 2N planar coils make up coil groups where a planar coil having the i'th (where i=1 through N) highest inductance value out of the 2N planar coils, and a planar coil having the i'th-lowest inductance value planar, are serially connected, so the composite inductance values of the coil groups are averaged so as to be close values.

Accordingly, loss of resistance value balance among the coil groups connected in parallel can be suppressed, so loss of current flowing through the layered planar coils can be reduced. Consequently, unnecessary generation of heat can be reduced, and transmission efficiency can be improved.

(2) A power transmission device according to a second aspect of the present disclosure is the power transmission device according to the first aspect,
wherein, in a case where N is 2, a planar coil having a highest inductance value and a planar coil having a lowest inductance value are serially connected, and a planar coil having a second highest inductance value and a planar coil having a second lowest inductance value are serially connected.

According to this aspect, the composite inductance values of the coil groups (multiple planar coils serially connected) of the four planar coils layered within the power transmission device, connected in parallel, are averaged so as to be close values.

(3) A power transmission device according to a third aspect of the present disclosure is the power transmission device according to either one of the first or second aspect,
wherein a magnetic substance is provided on a side of the power transmission coil opposite from the power transmission plane in the power transmission device.

According to this aspect, eddy current loss in the power transmission coil can be reduced.

(4) A power transmission device according to a fourth aspect of the present disclosure is the power transmission device according to any one of the first through third aspects,
wherein the 2N planar coils are constituted by a multi-layer board including winding conductor patterns on insulating boards or dielectric boards, the conductor patterns being layered.

According to this aspect, the thickness of the power transmission device can be reduced.

(5) A power transmission device according to a fifth aspect of the present disclosure is the power transmission device according to any one of the first through fourth aspects,
wherein the at least one power transmission coil includes a plurality of power transmission coils.

According to this aspect, the area capable of power transmission can be broadened in a case where multiple power transmission coils are arrayed in a direction parallel to the power transmission plane.

(6) A power transmission device according to a sixth aspect of the present disclosure is the power transmission device according to any one of the first through fifth aspects,
wherein the power transmission coil includes one of a first additional planar coil connected in series to the 2N planar coils and a second additional planar coil connected in parallel to the 2N planar coils.

According to this aspect, inductance can be easily adjusted in a case where there is need to perform fine adjustment of inductance in circuit design, and so forth.

(7) A power transmission device according to a seventh aspect of the present disclosure is the power transmission device according to any one of the first through sixth aspects,
wherein the 2N planar coils are layered perpendicularly to the power transmission plane.

According to this aspect, the planar coils can be easily connected taking into consideration the order of magnitude in inductance values.

(8) A power transmission device according to eighth aspect of the present disclosure is the power transmission device according to any one of the first through sixth aspects,
wherein the 2N planar coils are sectioned in increments of layers,
wherein multiple planar coils are provided to each layer,
and wherein the layers are layered perpendicularly to the power transmission plane.

According to this aspect, multiple planar coils can be disposed in each layer, so the thickness of the power transmission coil can be reduced.

(9) A vehicle according to a ninth aspect of the present disclosure is a vehicle, in which is installed the power transmission device according to any one of the first through eighth aspects.

According to this aspect, charging of electronic devices within the vehicle can be performed with high transmission efficiency.

(10) A wireless power transmission system according to a tenth aspect of the present disclosure is a wireless power transmission system, including:

the power transmission device according to any one of the first through eighth aspects; and the power receiving device.

According to this aspect, a wireless power transmission system having a power transmission device that is thin and has high power transmission efficiency can be realized. Such a wireless power transmission system may be a system for a medical robot or transportation robot, for example.

(11) A power transmission coil according to an eleventh aspect of the present disclosure is a power transmission coil used in a power transmission device having a surface a part of which defines a power transmission plane, the device including:

a power transmission circuit converting DC power into AC power; and a power transmission coil structure including 2N planar coils (N is an integer of two or larger) laminated in a direction which is perpendicular to the power transmission plane, the power transmission coil structure wirelessly transmitting the converted AC power to a power receiving coil of a power receiving device via the power transmission plane and being disposed on a side toward the power transmission plane in the power transmission device, wherein the 2N planer coils constitute coil groups including a coil group in which a planar coil having an i'th highest inductance out of the 2N planar coils and a planar coil having an i'th-lowest inductance are connected in series where i denotes any one integer of one to N, and the coil groups are connected in parallel to each other.

According to this aspect, advantages the same as those of the first aspect can be obtained.

(12) A power transmission antenna according to an twelfth aspect of the present disclosure includes:

the power transmission coil according to the eleventh aspect, and a resonance capacitor.

According to this aspect, advantages the same as those of the first aspect can be obtained.

(13) A power transmission device according to a thirteenth aspect of the present disclosure is a power transmission device having a surface a part of which defines a power transmission plane, the device including:

a power transmission circuit converting DC power into AC power;

a power transmission coil structure including M planar coils (M is an integer of three or larger) laminated in a direction which is perpendicular to the power transmission plane, the power transmission coil structure wirelessly transmitting the converted AC power to a power receiving coil of a power receiving device via the power transmission plane and being disposed on a side toward the power transmission plane in the power transmission device, wherein the M planer coils constitute coil groups including a coil group in which two or more planar coils are selected by an order different from the order of magnitude in the inductance values are connected in series, and the coil groups are connected in parallel to each other.

According to this aspect, the inductance values of the M planar coils within the power transmission device are different. The M planar coils include two or more coil groups where two or more planar coils are selected by an order different from the order of magnitude in inductance values, and connected serially as a set.

Accordingly, the composite inductance values of the coil groups are made to be values as close as possible. Accordingly, loss of resistance balance among the coil groups connected in parallel can be suppressed, so loss of current flowing through the layered planar coils can be reduced. Consequently, unnecessary generation of heat can be reduced, and transmission efficiency can be improved.

Also, there is no need to layer the planar coils such that the inductance values of the planar coils are in the order of $L1<L2<L3<L4$ from one face of the power transmission antenna to the other face.

(14) A power transmission device according to a fourteenth aspect of the present disclosure is the power transmission device according to the thirteenth aspect, wherein the M planar coils are layered in ascending order or descending order of the inductance values.

According to this aspect, the planar coils can be easily connected taking into consideration the order of magnitude in inductance values.

(15) A power transmission device according to a fifteenth aspect of the present disclosure is the power transmission device according to either the thirteenth or fourteenth aspect, wherein the M planar coils are layered perpendicularly to the power transmission plane.

According to this aspect, the planar coils can be easily connected taking into consideration the order of magnitude in inductance values.

(16) A power transmission device according to a sixteenth aspect of the present disclosure is the power transmission device according to the thirteenth aspect, wherein the M planar coils are sectioned in increments of layers, wherein multiple planar coils are provided to each layer, and wherein the layers are layered perpendicularly to the power transmission plane.

According to this aspect, multiple planar coils can be disposed in each layer, so the thickness of the power transmission coil can be reduced.

(17) A power transmission device according to a seventeenth aspect of the present disclosure is the power transmission device according to any one of the thirteenth through sixteenth aspects, wherein a magnetic substance is provided on a side of the power transmission coil opposite from the power transmission plane in the power transmission device.

According to this aspect, eddy current loss in the power transmission coil can be reduced.

(18) A power transmission device according to an eighteenth aspect of the present disclosure is the power transmission device according to any one of the thirteenth through seventeenth aspects, wherein the M planar coils are constituted by a multi-layer board including winding conductor patterns on insulating boards or dielectric boards, the conductor patterns being layered.

According to this aspect, the thickness of the power transmission device can be reduced.

(19) A power transmission device according to a nineteenth aspect of the present disclosure is the power transmission device according to any one of the thirteenth through eighteenth aspects, wherein the at least one power transmission coil includes a plurality of power transmission coils.

According to this aspect, the area capable of power transmission can be broadened in a case where multiple power transmission coils are arrayed in a direction parallel to the power transmission plane.

(20) A power transmission device according to a twentieth aspect of the present disclosure is the power transmission device according to any one of the thirteenth through nineteenth aspects, wherein the power transmission coil includes one of a third additional planar coil serially connected to the M planar coils, and a fourth additional planar coil connected in parallel to the M planar coils.

According to this aspect, inductance can be easily adjusted in a case where there is need to perform fine adjustment of inductance in circuit design, and so forth.

(21) A vehicle according to a twenty-first aspect of the present disclosure is a vehicle in which is installed the power transmission device according to any one of the thirteenth through twentieth aspects.

According to this aspect, charging of electronic devices within the vehicle can be performed with high power transmission efficiency.

(22) A wireless power transmission system according to a twenty-second aspect of the present disclosure is a wireless power transmission system, including:

the power transmission device according to any one of the thirteenth through sixteenth aspects; and the power receiving device.

According to this aspect, a wireless power transmission system having a power transmission device that is thin and has high power transmission efficiency can be realized. Such a wireless power transmission system may be a system for a medical robot or transportation robot, for example.

(23) A power transmission coil according to a twenty-third aspect of the present disclosure is a power transmission coil used in a power transmission device that transmits AC power noncontact to a power receiving device that has a power receiving coil, wherein the power transmission device includes
a power transmission plane that transmits power to the power receiving device,
a power transmission circuit that converts DC power input from a DC power source into AC power;
at least one power transmission coil that transmits the AC power output from the power transmission circuit to the power receiving coil, and
a magnetic substance disposed within the power transmission device, on the side of the power transmission coil opposite from the power transmission plane side, wherein the power transmission coil is disposed within the power transmission device at the side toward the power transmission plane and includes M (where M is a positive integer of 3 or larger) planar coils having different inductance values, wherein the M planar coils make up two or more coil groups, including a coil group where two or more planar coils are selected by an order different from the order of magnitude in inductance values, and connected serially, and wherein the two or more coil groups are each connected in parallel.

According to this aspect, advantages the same as those of the thirteenth aspect can be obtained.

(24) A power transmission antenna according to a twenty-fourth aspect of the present disclosure includes:

the power transmission coil according to the twenty-third aspect, and a resonance capacitor.

According to this aspect, advantages the same as those of the thirteenth aspect can be obtained.

(25) A power receiving device according to a twenty-fifth aspect of the present disclosure is a power receiving device that receives AC power wirelessly from a power transmission device that has a power transmission coil, the power receiving device including:

a power receiving circuit converting DC power into AC power; and a power receiving coil structure including 2N planar coils (N is an integer of two or larger) laminated in a direction which is perpendicular to the power receiving plane, the power receiving coil structure wirelessly transmitting the converted AC power to a power receiving coil of a power receiving device via the power receiving plane and being disposed on a side toward the power receiving plane in the power receiving device. The 2N planer coils constitute coil groups including a coil group in which a planar coil having an i'th highest inductance out of the 2N planar coils and a planar coil having an i'th-lowest inductance are connected in series where i denotes any one integer of one to N, and the coil groups are connected in parallel to each other.

According to this aspect, a power receiving device can be provided which has the same advantages the same as those of the first aspect.

(26) A power receiving coil according to a twenty-sixth aspect of the present disclosure is a power receiving coil used in a power receiving device that receives AC power noncontact from a power transmission device that has a power transmission coil, wherein the power receiving device includes
a power receiving circuit converting DC power into AC power; and a power receiving coil structure including 2N planar coils (N is an integer of two or larger) laminated in a direction which is perpendicular to the power receiving plane, the power receiving coil structure wirelessly transmitting the converted AC power to a power receiving coil of a power receiving device via the power receiving plane and being disposed on a side toward the power receiving plane in the power receiving device. The 2N planer coils constitute coil groups including a coil group in which a planar coil having an i'th highest inductance out of the 2N planar coils and a planar coil having an i'th-lowest inductance are connected in series where i denotes any one integer of one to N, and the coil groups are connected in parallel to each other.

According to this aspect, advantages the same as those of the twenty-fifth aspect can be obtained.

(27) A power receiving antenna according to a twentieth-seventh aspect of the present disclosure includes:

the power receiving coil according to the twenty-sixth aspect, and a resonance capacitor.

According to this aspect, advantages the same as those of the twenty-fifth aspect can be obtained.

(28) A power receiving device according to a twenty-eighth aspect of the present disclosure is a power receiving device that receives AC power wirelessly from a power transmission device that has a power transmission coil, the power receiving device including:

a power receiving circuit converting DC power into AC power;
a power receiving coil structure including M planar coils (M is an integer of three or larger) laminated in a direction which is perpendicular to the power receiving plane, the power receiving coil structure wirelessly transmitting the converted AC power to a power receiving coil of a power receiving device via the power receiving plane and being disposed on a side toward the power receiving plane in the power receiving device, wherein the M planer coils constitute coil groups including a coil group in which two or more planar coils are selected by an order different from the order of magnitude in the inductance values are connected in series, and the coil groups are connected in parallel to each other.

According to this aspect, a power receiving device can be provided which has the same advantages the same as those of the thirteenth aspect.

(29) A power receiving coil according to a twenty-ninth aspect of the present disclosure is a power receiving coil used in a power receiving device that receives AC power noncontact from a power transmission device that has a power transmission coil, wherein the power receiving device includes a power receiving circuit converting DC power into AC power;

a power receiving coil structure including M planar coils (M is an integer of three or larger) laminated in a direction which is perpendicular to the power receiving plane, the power receiving coil structure wirelessly transmitting the converted AC power to a power receiving coil of a power receiving device via the power receiving plane and being disposed on a side toward the power receiving plane in the power receiving device, wherein the M planer coils constitute coil groups including a coil group in which two or more planar coils are selected by an order different from the order of magnitude in the inductance values are connected in series, and the coil groups are connected in parallel to each other.

According to this aspect, advantages the same as those of the twenty-eighth aspect can be obtained.

(30) A power reception antenna according to a thirtieth aspect of the present disclosure includes:

the power receiving coil according to the twenty-ninth aspect, and a resonance capacitor.

According to this aspect, advantages the same as those of the twenty-eighth aspect can be obtained.

The power transmission device and wireless power transmission system according to the present disclosure are widely applicable to usages of charging or power supply to electric automobiles, audiovisual devices, batteries, medical devices, and so forth, for example.

What is claimed is:

1. A power transmission device having a surface a part of which defines a power transmission plane, the device comprising:

a power transmission circuit converting DC power into AC power; and a power transmission coil structure including 2N planar coils (N is an integer of two or larger) laminated in a direction perpendicular to the power transmission plane, the power transmission coil structure wirelessly transmitting the converted AC power to a power receiving coil of a power receiving device via the power transmission plane and being disposed on a side toward the power transmission plane in the power transmission device, the 2N planar coils wherein the 2N planar coils constitute N coil groups, i'th coil group of the N coil groups includes a planar coil having an i'th highest inductance out of the 2N planar coils and a planar coil having an i'th-lowest inductance, where i denotes an integer of one to N, the planar coil having the i'th highest inductance and the planar coil having the i'th-lowest inductance in the i'th coil group are connected in series with each other, and the N coil groups are connected in parallel to each other.

2. The power transmission device according to claim 1, wherein, in a case where N is 2, a planar coil having a highest inductance and a planar coil having a lowest inductance are serially connected, and a planar coil having a second highest inductance and a planar coil having a second lowest inductance are serially connected.

3. The power transmission device according to claim 1, wherein a magnetic substance is provided on a side of the power transmission coil structure opposite from the power transmission plane in the power transmission device.

4. The power transmission device according to claim 1, wherein the 2N planar coils comprise a multi-layer board including a plurality of boards being layered, each of the plurality of boards including a winding conductor pattern provided on an insulating board or a dielectric board.

5. The power transmission device according to claim 1, wherein the power transmission coil structure comprises a plurality of power transmission coil structures.

6. The power transmission device according to claim 1, wherein the power transmission coil structure further includes one of a first additional planar coil connected in series to the 2N planar coils and a second additional planar coil connected in parallel to the 2N planar coils.

7. The power transmission device according to claim 1, wherein the 2N planar coils are layered perpendicularly to the power transmission plane.

8. The power transmission device according to claim 1, wherein the 2N planar coils are sectioned in increments of layers, wherein multiple planar coils are provided to each layer, and wherein the layers are layered perpendicularly to the power transmission plane.

9. A vehicle, in which is installed the power transmission device according to claim 1.

10. A wireless power transmission system, comprising:
the power transmission device according to claim 1; and
the power receiving device.

11. A power transmission coil used in a power transmission device having a surface a part of which defines a power transmission plane, the device comprises:

a power transmission circuit converting DC power into AC power; and a power transmission coil structure including 2N planar coils (N is an integer of two or larger) laminated in a direction which is perpendicular to the power transmission plane, the power transmission coil structure wirelessly transmitting the converted AC power to a power receiving coil of a power receiving device via the power transmission plane and being disposed on a side toward the power transmission plane in the power transmission device, wherein the 2N planar coils constitute N coil groups, i'th coil group of the N coil groups includes a planar coil having an i'th highest inductance out of the 2N planar coils and a planar coil having an i'th-lowest inductance, where i denotes an integer of one to N, the planar coil having the i'th highest inductance and the planar coil having the i'th-lowest inductance in the i'th coil group are connected in series with each other, and the N coil groups are connected in parallel to each other.

12. A power transmission antenna comprising:
the power transmission coil according to claim 11, and
a resonance capacitor.

13. A power transmission device having a surface a part of which defines a power transmission plane, the device comprising:
 a power transmission circuit converting DC power into AC power;
 a power transmission coil structure including M planar coils (M is an integer of three or larger) laminated in a direction which is perpendicular to the power transmission plane, the power transmission coil structure wirelessly transmitting the converted AC power to a power receiving coil of a power receiving device via the power transmission plane and being disposed on a side toward the power transmission plane in the power transmission device,
 wherein the M planar coils have different inductances increasing from first to M'th planar coils;
 the M planar coils constitute N coil groups, where N is an integer larger than one and smaller than M,
 i'th coil group of the N coil groups includes at least two planar coils of the M planar coils, where i denotes an integer of one to N,
 the at least two planar coils in the i'th coil group are selected from the M planar coils by an order different from an order of the inductances of the M planar coils,
 each planar coil included in the i'th coil group is connected in series with each other planar coil included in the i'th coil group, and
 the N coil groups are connected in parallel to each other.

14. The power transmission device according to claim 13, wherein the M planar coils are layered in ascending order or descending order of the inductance values.

15. The power transmission device according to claim 13, wherein the M planar coils are layered perpendicularly to the power transmission plane.

16. The power transmission device according to claim 13, wherein the M planar coils are sectioned in increments of layers,
 wherein multiple planar coils are provided to each layer, and wherein the layers are layered perpendicularly to the power transmission plane.

17. The power transmission device according to claim 13, wherein a magnetic substance is provided on a side of the power transmission coil structure opposite from the power transmission plane in the power transmission device.

18. The power transmission device according to claim 13, wherein the M planar coils comprise a multi-layer board including a plurality of boards being layered, each of the plurality of boards including a winding conductor pattern provided on an insulating board or a dielectric board.

19. The power transmission device according to claim 13, wherein the power transmission coil structure comprises a plurality of power transmission coil structures.

20. The power transmission device according to claim 13, wherein the power transmission coil structure further includes one of a first additional planar coil serially connected to the M planar coils, and a second additional planar coil connected in parallel to the M planar coils.

* * * * *